(12) United States Patent
Bando et al.

(10) Patent No.: US 9,242,818 B2
(45) Date of Patent: Jan. 26, 2016

(54) SYSTEM FOR AND METHOD OF TRANSFERRING PLATE-SHAPED MEMBER WITH INTERLEAVING PAPER THEREON

(75) Inventors: Kenji Bando, Kobe (JP); Takuya Fukuda, Kakogawa (JP); Akifumi Wakisaka, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 121 days.

(21) Appl. No.: 14/123,342

(22) PCT Filed: May 16, 2012

(86) PCT No.: PCT/JP2012/003183
§ 371 (c)(1),
(2), (4) Date: Jan. 27, 2014

(87) PCT Pub. No.: WO2012/164842
PCT Pub. Date: Dec. 6, 2012

(65) Prior Publication Data
US 2014/0169925 A1    Jun. 19, 2014

(30) Foreign Application Priority Data
May 30, 2011  (JP) .................... 2011-120512

(51) Int. Cl.
*B65H 3/08* (2006.01)
*B65G 49/06* (2006.01)
(Continued)

(52) U.S. Cl.
CPC ............ *B65H 3/0816* (2013.01); *B65G 49/069* (2013.01); *B65H 3/54* (2013.01);
(Continued)

(58) Field of Classification Search
CPC ............ B65H 2701/18264; B65H 2701/1928; B65H 3/02; B65H 3/0816; B65H 2405/50; B65H 2405/57; B65H 2301/5121; B65H 49/068

USPC .................. 271/104, 106, 11, 19, 91, 95, 98; 414/795.5, 795.7, 796.5, 796.9, 797, 414/798.9, 927–929; 53/157
See application file for complete search history.

(56) References Cited

U.S. PATENT DOCUMENTS 4,583,727 A * 4/1986 Fort ............................... 271/19
4,697,837 A * 10/1987 Fort ............................ 294/202
(Continued)

FOREIGN PATENT DOCUMENTS

EP       1862413 A1 * 12/2007 ............... B65H 3/02
EP       1975098 A2 * 10/2008 ............... B65H 3/08
(Continued)

OTHER PUBLICATIONS

International Search Report issued in International Patent Application No. PCT/JP2012/003183 dated Jun. 19, 2012.
(Continued)

*Primary Examiner* — Gregory Adams
(74) *Attorney, Agent, or Firm* — Oliff PLC

(57) ABSTRACT

In a system for transferring a plate-shaped member with interleaving paper thereon, a suction adhesion device included in a suction adhesion unit includes suction pads that adhere to a surface of a glass plate by suction with interleaving paper in between the surface and the suction pads; an air blowing device blows air between the adhered glass plate and a glass plate positioned below the adhered glass plate; a robot moves the suction adhesion unit; a clamping device includes a pair of pushing members that are arranged at both sides, respectively, of the glass plates and move toward the glass plates to come close to each other; and at least before the suction adhesion unit lifts the adhered glass plate, a controller causes the pair of pushing members to move to push protruding portions of pieces of interleaving paper, the protruding portions protruding from the sides of the glass plates.

10 Claims, 13 Drawing Sheets

(51) Int. Cl.
 *B65H 3/54* (2006.01)
 *B65G 59/00* (2006.01)
 *B65G 59/04* (2006.01)

(52) U.S. Cl.
 CPC .............. *B65G 59/005* (2013.01); *B65G 59/04* (2013.01); *B65G 2249/045* (2013.01); *B65H 2701/18264* (2013.01)

(56) References Cited

U.S. PATENT DOCUMENTS

| | | | | |
|---|---|---|---|---|
| 5,018,715 | A | * | 5/1991 | Reeves et al. .................... 271/19 |
| 6,164,637 | A | * | 12/2000 | Harari .............................. 271/19 |
| 6,345,818 | B1 | * | 2/2002 | Stephan et al. ................... 271/91 |
| 6,468,025 | B1 | * | 10/2002 | Stumpf et al. ................. 414/797 |
| 6,745,694 | B1 | * | 6/2004 | Ellis et al. ..................... 101/477 |
| 7,000,541 | B2 | * | 2/2006 | Yee et al. ....................... 101/408 |
| 7,229,241 | B2 | * | 6/2007 | Solomon et al. .......... 414/416.07 |
| 7,614,619 | B2 | * | 11/2009 | Yuen ................................ 271/11 |

FOREIGN PATENT DOCUMENTS

| | | | |
|---|---|---|---|
| JP | S55-21373 A | | 2/1980 |
| JP | Y2-6-1546 | | 1/1994 |
| JP | 07010301 A | * | 1/1995 ............... B65H 3/08 |
| JP | 2000351449 A | * | 12/2000 ............. B65G 59/04 |
| JP | 2007161354 A | * | 6/2007 |
| JP | 2009-120311 A | | 6/2009 |
| JP | 2009-126609 A | | 6/2009 |
| JP | 2010-100397 A | | 5/2010 |
| WO | 2012115109 A1 | | 8/2012 |

OTHER PUBLICATIONS

Mar. 19, 2015 Extended Supplementary Search Report issued in European Application No. 12 79 3841.3.

* cited by examiner

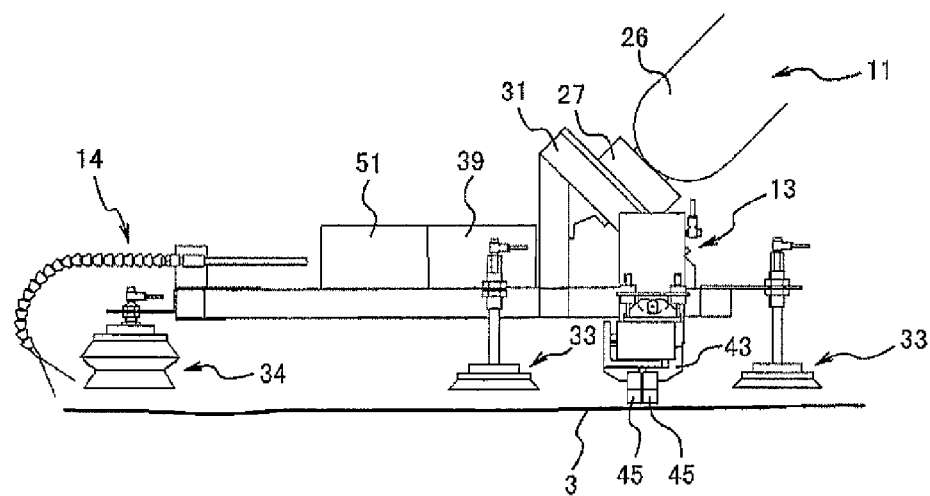
Fig. 13A
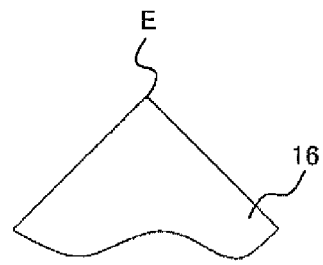
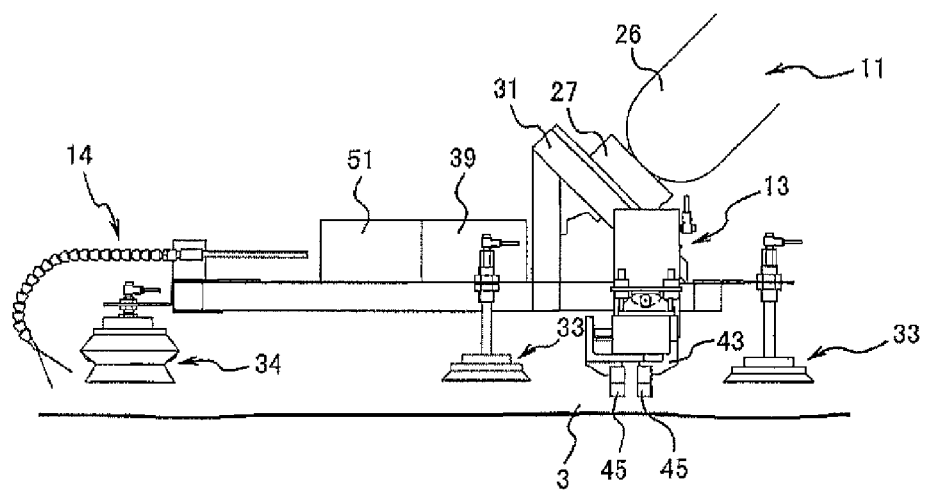
Fig. 13B
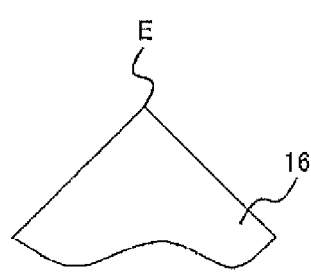

SYSTEM FOR AND METHOD OF TRANSFERRING PLATE-SHAPED MEMBER WITH INTERLEAVING PAPER THEREON

TECHNICAL FIELD

The present invention relates to a system for and a method of transferring a plate-shaped member with interleaving paper thereon, the system and method being configured to transfer an uppermost plate-shaped member from a plurality of plate-shaped members that are stacked with interleaving paper placed on the upper surface of each plate-shaped member.

BACKGROUND ART

If plate-shaped members such as glass plates are stored in such a manner that each plate-shaped member is placed side by side separately, then large storage space is necessary. For this reason, there are cases where a plurality of plate-shaped members are stored such that they are stacked vertically. In such a case, interleaving paper is inserted between stacked plate-shaped members so that the plate-shaped members will not cause damage to each other. Although the interleaving paper is necessary when the plate-shaped members are stacked, the interleaving paper becomes unnecessary when the plate-shaped members are processed. Therefore, how to remove the interleaving paper from the upper surface of each plate-shaped member is a problem to be solved. As a device intended to solve the problem, for example, Patent Literature 1 discloses a suction adhesion transfer device. The suction adhesion transfer device disclosed in Patent Literature 1 is configured such that main and auxiliary suction pads are pressed against interleaving paper placed on a surface of a glass plate. The main and auxiliary pads adhere to the glass plate by suction with the interleaving paper in between the glass plate and the pads, and then the glass plate is transferred in such an adhered state.

CITATION LIST

Patent Literature

PTL 1: Japanese Examined Utility Model Publication No. 6-1546

SUMMARY OF INVENTION

Technical Problem

However, in the suction adhesion transfer device disclosed in Patent Literature 1, when one glass plate is transferred in such an adhered state, it is often the case that interleaving paper and another glass plate that are positioned below the one glass plate are unintentionally stuck to the lower surface of the one glass plate and taken away together with the one glass plate. The interleaving paper and the other glass plate below the one glass plate are stuck to the lower surface of the one glass plate by static electricity. For this reason, the interleaving paper and the other glass plate fall down from the one glass plate due to their own weight while the one glass plate is being transferred. As a result, the other glass plate stuck to the one glass plate may become damaged and/or the interleaving paper stuck to the one glass plate may litter the vicinity of the suction adhesion transfer device. If the interleaving paper falls and interferes with the suction adhesion transfer device, the suction adhesion transfer device will become unable to operate properly, which is another problem.

Therefore, an object of the present invention is to provide a system for and a method of transferring a plate-shaped member with interleaving paper thereon, the system and method being capable of transferring an uppermost plate-shaped member from stacked plate-shaped members while preventing interleaving paper and another plate-shaped member that are positioned below the uppermost plate-shaped member from being taken away together with the uppermost plate-shaped member.

Solution to Problem

A system for transferring a plate-shaped member with interleaving paper thereon according to the present invention is configured to transfer an uppermost plate-shaped member from a plurality of plate-shaped members that are stacked with pieces of interleaving paper placed on respective upper surfaces of the plate-shaped members. The system includes: a suction adhesion device including a plurality of suction pads configured to adhere to a surface of the uppermost plate-shaped member by suction with the interleaving paper in between the surface and the suction pads; an air blowing device configured to blow air between the adhered plate-shaped member and the plate-shaped member that is positioned below the adhered plate-shaped member; a robot configured to move the suction adhesion device; a pushing device disposed at a side of the stacked plate-shaped members, the pushing device including a pushing member configured to move toward the plate-shaped members to push protruding portions of the respective pieces of interleaving paper, the protruding portions protruding from the plate-shaped members; and a controller configured to control operations of the pushing device, the suction adhesion device, the air blowing device, and the robot. The plurality of suction pads are arranged such that adhering surfaces thereof are positioned substantially on a predetermined imaginary plane. The suction pad that is disposed at a forefront position is configured such that the adhering surface thereof moves upward relative to the imaginary plane. The controller is configured to: after causing the plurality of suction pads to adhere to the plate-shaped member by suction, cause the suction pad disposed at the forefront position to move upward to warp a portion of an outer edge of the plate-shaped member; cause the air blowing device to blow air between the warped portion and the plate-shaped member that is positioned below the warped portion, and then cause the suction adhesion device to be lifted upward; and at least before the suction adhesion device is lifted, cause the pushing member to move to push protruding portions of the respective pieces of interleaving paper, the protruding portions protruding from the side of the plate-shaped members.

According to the present invention, the plurality of suction pads are caused to adhere to the plate-shaped member by suction with the interleaving paper in between the plate-shaped member and the suction pads. Accordingly, the plate-shaped member can be transferred with the interleaving paper left placed on the plate-shaped member. After the plurality of suction pads adhere to the plate-shaped member by suction, the adhering surface of a predetermined suction pad is moved upward. In this manner, the outer edge of the plate-shaped member can be warped. The air blowing device blows air between the warped portion and the interleaving paper that is positioned below the warped portion so that, at the time of transferring the plate-shaped member, the stacked plate-shaped members will be easily removed from each other and the plate-shaped member to be transferred will be easily removed from the interleaving paper positioned therebelow.

Further, according to the present invention, by moving the pushing member, protruding portions of the respective pieces of interleaving paper, the protruding portions protruding from the plate-shaped members, can be pushed toward the plate-shaped members. By pushing the protruding portions of the interleaving paper in such a manner, another plate-shaped member and the interleaving paper thereon can be prevented from sticking to the plate-shaped member to be transferred. That is, only the plate-shaped member and the interleaving paper that are to be transferred can be transferred. Thus, the following situations can be prevented from occurring: a situation where, at the time of transferring one plate-shaped member, another plate-shaped member is taken away together with the one plate-shaped member, and then falls from the one plate-shaped member due to its own weight to become damaged; and a situation where, at the time of transferring the one plate-shaped member, the interleaving paper therebelow is taken away together with the one plate-shaped member, and then falls from the one plate-shaped member to become litter.

In the above-described invention, preferably, the system includes a holding device provided at the suction adhesion device. The holding device preferably includes: a pair of holding tools configured to move relative to each other along the surface of the plate-shaped member; and a holding drive unit configured to cause the pair of holding tools to move relative to each other. The controller is preferably configured to control the holding drive unit to cause the pair of holding tools to move relative to each other on the plate-shaped member, such that the holding tools hold the interleaving paper that is on the plate-shaped member.

According to the above configuration, the interleaving paper can be held in a pinched mariner on the surface of the plate-shaped member and removed from the top of the plate-shaped member. This makes it possible to perform an interleaving paper removal operation immediately after transferring the plate-shaped member, without having to temporarily return the suction adhesion device to a predetermined position. Thus, a time required for the transfer work per plate-shaped member can be reduced.

In the above-described invention, preferably, the holding device includes an advancing/retracting mechanism configured to cause the pair of holding tools to advance toward and retract from the surface of the plate-shaped member, and the pair of holding tools is swingably attached to the advancing/retracting mechanism.

According to the above configuration, the advancing/retracting mechanism causes the pair of holding tools to advance and come into contact with the surface of the plate-shaped member. In this manner, the pair of holding tools can be caused to swing in accordance with an inclination of the surface of the plate-shaped member. As a result, the orientation of the pair of holding tools can be adjusted to correspond to the inclination of the surface of the plate-shaped member, and the pair of holding tools can be moved relative to each other along the surface of the plate-shaped member. This allows the pair of holding tools to hold the interleaving paper more assuredly.

In the above-described invention, preferably, the pair of holding tools is configured such that distal ends of the respective holding tools come into contact with the surface of the plate-shaped member with the interleaving paper in between the surface and the distal ends, and the distal ends of the pair of holding tools are formed of an elastic material.

According to the above configuration, the pair of holding tools comes into contact with the surface of the plate-shaped member with the interleaving paper in between the surface and the holding tools. Therefore, damage to the surface of the plate-shaped member when the pair of holding tools comes into contact with the surface can be reduced. Moreover, the distal ends of the pair of holding tools are formed of an elastic material. This makes it possible to further reduce the damage to the surface of the plate-shaped member.

In the above-described invention, preferably, the system includes an interleaving paper storage tool projecting upward such that the interleaving paper storage tool has at least one straight ridge. The controller is preferably configured to cause the robot to move the suction adhesion device such that a center line of the interleaving paper that is held by the holding device is positioned above the ridge of the interleaving paper storage tool, and then cause one of the holding tools to move away from the other holding tool such that the interleaving paper is released from the holding device.

According to the above configuration, the interleaving paper falls onto the ridge of the interleaving paper storage tool. Then, the interleaving paper is bent along the ridge and lands on the surface of the interleaving paper storage tool. At the time of releasing the interleaving paper, the center line of the interleaving paper is positioned so as to substantially coincide with the ridge of the interleaving paper storage tool. Accordingly, the interleaving paper is bent such that the interleaving paper is substantially bisected. Therefore, the interleaving paper does not slip down from the interleaving paper storage tool, and stays at the landed position. This makes it possible to prevent the interleaving paper removed from the surface of the plate-shaped member from scattering. Moreover, since the interleaving paper storage tool has a straight ridge, the interleaving paper can be placed on the interleaving paper storage tool without causing the interleaving paper to be wrinkled. Therefore, a plurality of pieces of interleaving paper can be stacked on the interleaving paper storage tool. This makes it possible to make the interleaving paper storage space compact.

In the above-described invention, preferably, the pair of holding tool is configured such that the holding tool come close to each other while lowering downward.

According to the above configuration, protruding portions of the interleaving paper can be pushed such that the protruding portions are bent downward. As a result, a plate-shaped member and interleaving paper that are not to be transferred can be suppressed from being lifted upward together with the plate-shaped member that is to be transferred, and also, the protruding portions do not interfere with the plate-shaped member lifting operation.

A transfer method according to the present invention is executed by the system for transferring a plate-shaped member with interleaving paper thereon according to the above-described invention. The system is configured to transfer an uppermost plate-shaped member from a plurality of plate-shaped members that are stacked with pieces of interleaving paper placed on respective upper surfaces of the plate-shaped members, the system including: a suction adhesion device including a plurality of suction pads configured to adhere to a surface of the uppermost plate-shaped member by suction with the interleaving paper in between the surface and the suction pads; an air blowing device configured to blow air between the adhered plate-shaped member and the plate-shaped member that is positioned below the adhered plate-shaped member; a robot configured to move the suction adhesion device; a pushing device disposed at a side of the stacked plate-shaped members, the pushing device including a pushing member configured to move toward the plate-shaped members; and a controller configured to control operations of the pushing device, the suction adhesion device, the air blowing device, and the robot. The plurality of suction pads are arranged such that adhering surfaces thereof are positioned substantially on a predetermined imaginary plane, and the suction pad that is disposed at a forefront position is configured such that the adhering surface thereof moves upward relative to the imaginary plane. The transfer method includes: a suction-adhering step in which the controller causes the plurality of suction pads to adhere to the plate-shaped member by suction with the interleaving paper in between the plate-shaped member and the suction pads; a warping step in which the controller causes the suction pad disposed at the forefront position to move upward to warp a portion of an outer edge of the plate-shaped member; an air blowing step in which the controller causes the air blowing device to blow air between the warped portion of the outer edge and the plate-shaped member that is positioned below the warped portion; a pushing step in which the controller causes the pushing member to move to push protruding portions of the respective pieces of interleaving paper, the protruding portions protruding from the side of the plate-shaped members; and a lifting step in which the controller causes the robot to lift the suction adhesion device upward after the air blowing step and the pushing step.

According to the present invention, the plurality of suction pads are caused to adhere to the plate-shaped member by suction with the interleaving paper in between the plate-shaped member and the suction pads. Accordingly, the plate-shaped member can be transferred with the interleaving paper left placed on the plate-shaped member. After the plurality of suction pads adhere to the plate-shaped member by suction, the adhering surface of a predetermined suction pad is moved upward. In this manner, the outer edge of the plate-shaped member can be warped. The air blowing device blows air between the warped portion and the interleaving paper that is positioned below the warped portion so that, at the time of transferring the plate-shaped member, the stacked plate-shaped members will be easily removed from each other and the plate-shaped member to be transferred will be easily removed from the interleaving paper positioned therebelow.

Further, according to the present invention, by moving the pushing member, protruding portions of the respective pieces of interleaving paper, the protruding portions protruding from the plate-shaped members, can be bent downward and pushed toward the plate-shaped members. By pushing the protruding portions of the interleaving paper in such a manner, another plate-shaped member and the interleaving paper thereon can be prevented from sticking to the plate-shaped member to be transferred. That is, only the plate-shaped member and the interleaving paper that are to be transferred can be transferred. Thus, the following situations can be prevented from occurring: a situation where, at the time of transferring one plate-shaped member, another plate-shaped member is taken away together with the one plate-shaped member, and then falls from the one plate-shaped member due to its own weight to become damaged; and a situation where, at the time of transferring the one plate-shaped member, the interleaving paper therebelow is taken away together with the one plate-shaped member, and then falls from the one plate-shaped member to become litter.

In the above-described invention, preferably, the pushing step is performed prior to the air blowing step.

According to the above, the interleaving paper between the plate-shaped member that is warped when blowing of the air is performed and the plate-shaped member that is positioned below the warped plate-shaped member can be prevented from being lifted together with the warped plate-shaped member. That is, by means of the blown air, the interleaving paper can be pressed onto the plate-shaped member that is positioned below the warped plate-shaped member.

In the above-described invention, preferably, the pushing step is performed prior to the warping step.

According to the above, when a portion of the outer edge of the plate-shaped member is warped, the interleaving paper between the warped plate-shaped member and the plate-shaped member below the warped plate-shaped member can be prevented from being lifted together with the warped plate-shaped member. Thus, in the air blowing step, the interleaving paper can be assuredly positioned on the surface of the plate-shaped member below the warped plate-shaped member, and then, by means of the blown air, the interleaving paper can be assuredly pressed onto the plate-shaped member below the warped plate-shaped member.

In the above-described invention, preferably, the system includes: a holding device provided at the suction adhesion device, the holding device being configured to hold the interleaving paper on the surface of the plate-shaped member; and an interleaving paper storage tool projecting upward such that the interleaving paper storage tool has at least one straight ridge. Preferably, the transfer method includes: a moving step in which the controller causes the robot to move, to a predetermined position, the plate-shaped member that has been lifted in the lifting step; a placing step in which the controller causes the plurality of suction pads adhering to the plate-shaped member that has been moved in the moving step to stop adhering to the plate-shaped member to place the plate-shaped member onto the predetermined position; a holding step in which the controller causes the holding device to hold the interleaving paper at the predetermined position; an interleaving paper moving step in which the controller causes the interleaving paper to be moved such that a center line of the interleaving paper is positioned above the ridge of the interleaving paper storage tool; and an interleaving paper placing step in which the controller causes the holding device to stop holding the interleaving paper to release the interleaving paper above the interleaving paper storage tool.

According to the above, when the interleaving paper is released in the interleaving paper placing step, the interleaving paper falls onto the ridge of the interleaving paper storage tool. Then, the interleaving paper is bent along the ridge and lands on the surface of the interleaving paper storage tool. In the interleaving paper placing step, the center line of the interleaving paper is positioned so as to substantially coincide with the ridge of the interleaving paper storage tool. Accordingly, when the interleaving paper is placed onto the interleaving paper storage tool, the interleaving paper is bent such that the interleaving paper is substantially bisected. Therefore, the interleaving paper does not slip down from the interleaving paper storage tool, and stays at the landed position. This makes it possible to prevent the interleaving paper removed from the surface of the plate-shaped member from scattering.

Advantageous Effects of Invention

The present invention makes it possible to transfer an uppermost plate-shaped member from stacked plate-shaped members while preventing interleaving paper and another plate-shaped member that are positioned below the uppermost plate-shaped member from being taken away together with the uppermost plate-shaped member.

The above object, other objects, features, and advantages of the present invention will be made clear by the following detailed description of preferred embodiments with reference to the accompanying drawings.

BRIEF DESCRIPTION OF DRAWINGS

FIG. 13A is a front view showing an operation of moving interleaving paper to be positioned above the interleaving paper storage tool of FIG. 8.

FIG. 13B is a front view showing an operation of dropping the interleaving paper from above the interleaving paper storage tool of FIG. 8.

DESCRIPTION OF EMBODIMENTS

Figure 1:
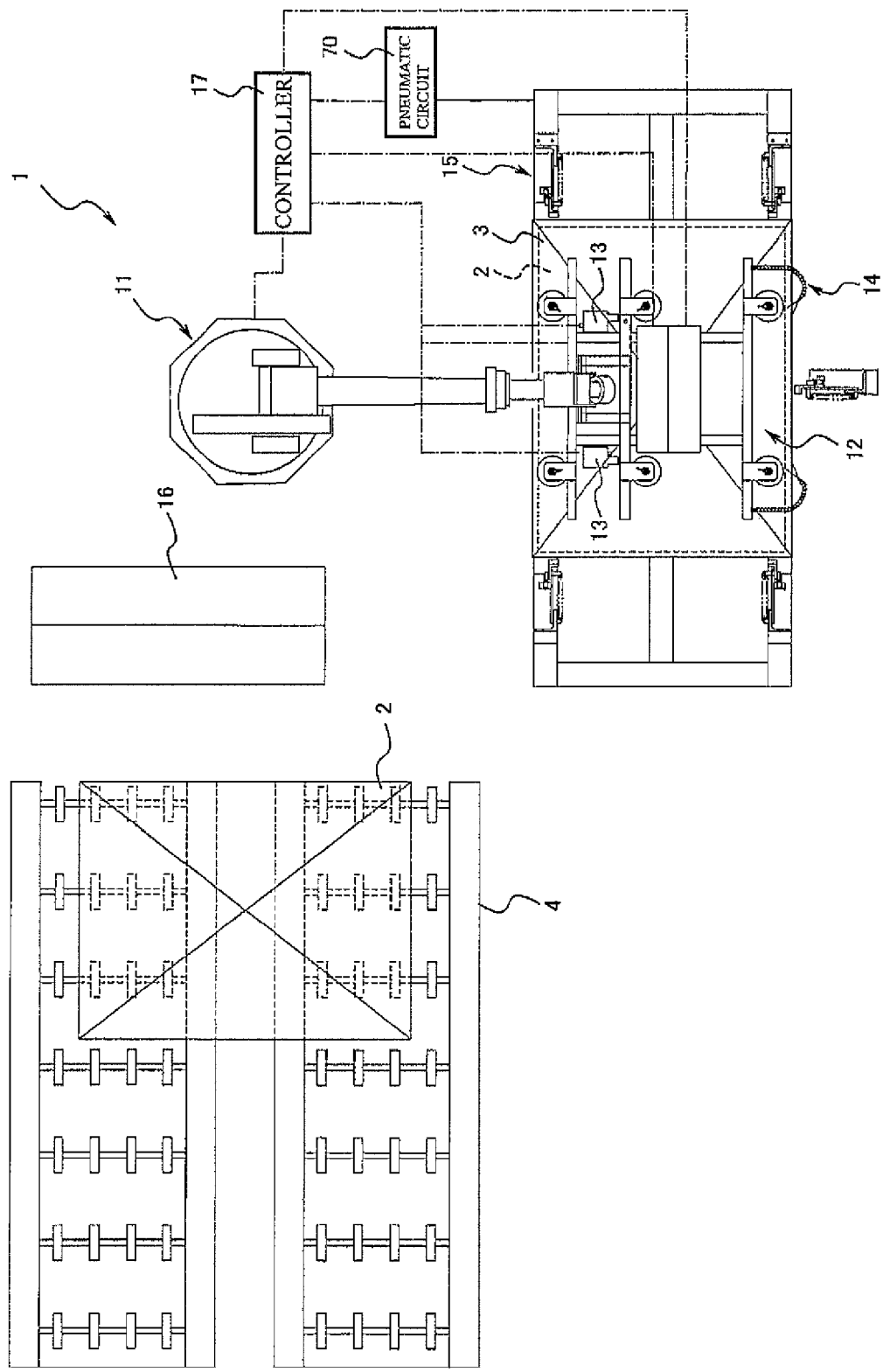
FIG. 1 is a plan view showing a system for transferring a plate-shaped member with interleaving paper thereon according to one embodiment of the present invention.

Hereinafter, a system 1 for transferring a plate-shaped member with interleaving paper thereon (hereinafter, the system may be simply referred to as a "transfer system 1") according to one embodiment of the present invention is described with reference to the drawings. Directions mentioned in the description below, such as up-down, left-right, and front-rear directions, are used for the sake of convenience of the description, but do not suggest that the arrangement, orientation, and the like of the components of the transfer system 1 are limited to such directions. The transfer system 1 described below is merely one embodiment of the present invention. The present invention is not limited to the embodiment below, and additions, deletions, and modifications can be made to the embodiment without departing from the spirit of the present invention.

<System for Transferring Plate-Shaped Member with Interleaving Paper Thereon>

The transfer system 1 is an apparatus for transferring a plate-shaped member (in the present embodiment, a glass plate 2) to a predetermined position. The glass plate 2 has a roughly rectangular shape when seen in plan view. Glass plates 2 are stacked vertically (see FIGS. 6 and 7). Interleaving paper 3 is placed on each glass plate 2 (see FIG. 7). The interleaving paper 3 has a roughly rectangular shape when seen in plan view, and is formed such that the outline of the interleaving paper 3 is larger than that of the glass plate 2. Therefore, outer edges of the interleaving paper 3 protrude outside of the glass plate 2, and dangle downward. The interleaving paper 3 placed in such a manner is inserted between two glass plates 2 that are vertically adjacent to each other so that these two glass plates 2 will not be rubbed with each other and damaged. The transfer system 1 is configured to hold, by suction and adhesion, the glass plate 2 together with the interleaving paper 3 placed on the upper surface of the glass plate 2, and to transfer the glass plate 2 in this state to a predetermined position, specifically, to a conveyor 4. The transfer system 1 includes a robot 11, a suction adhesion unit 12, holding devices 13, an air blowing device 14, a clamping device 15, an interleaving paper storage tool 16, and a controller 17.

<Robot>

Figure 2:
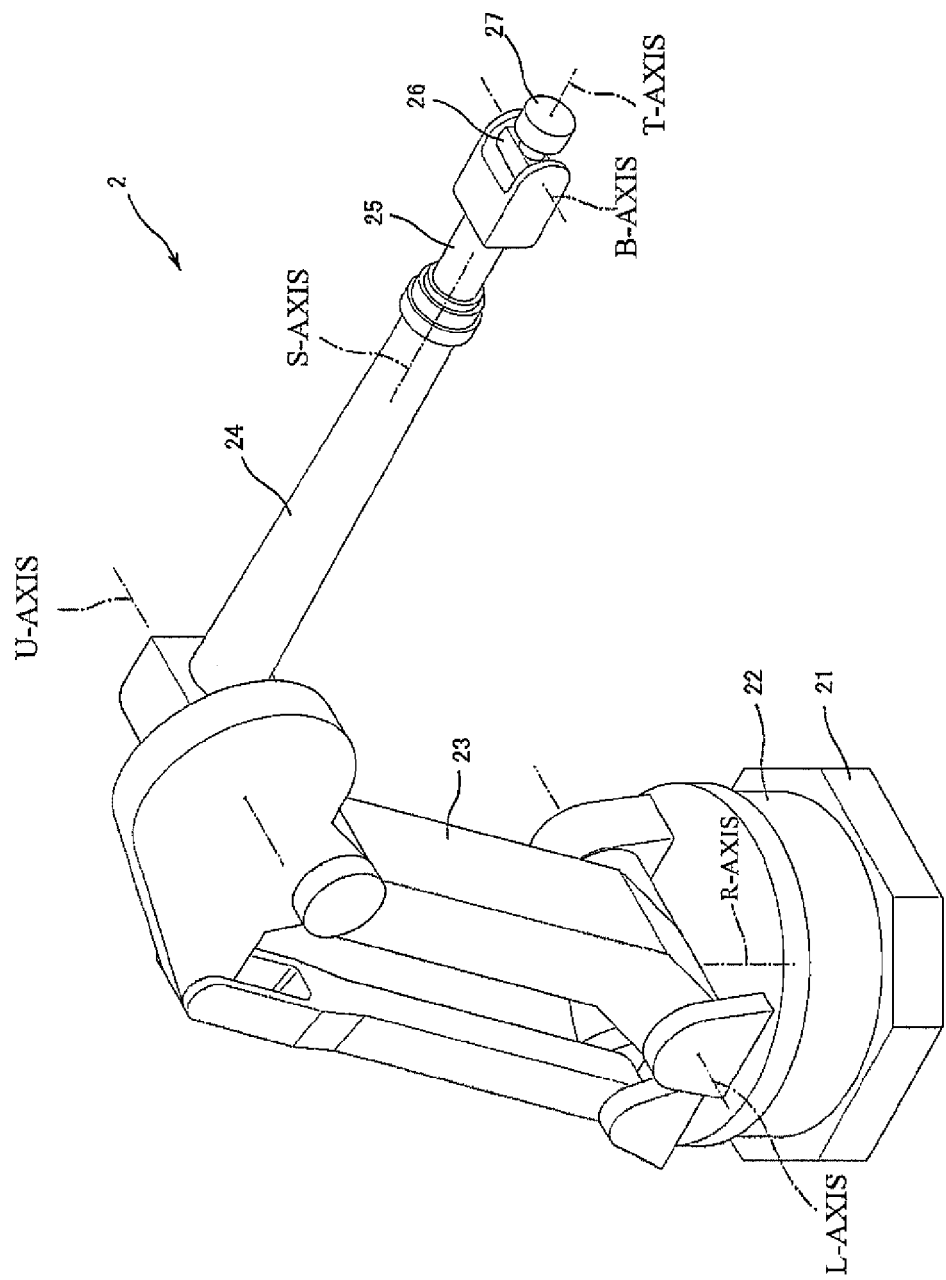
FIG. 2 is a perspective view showing a robot included in the system of FIG. 1 for transferring a plate-shaped member with interleaving paper thereon.
Figure 3:
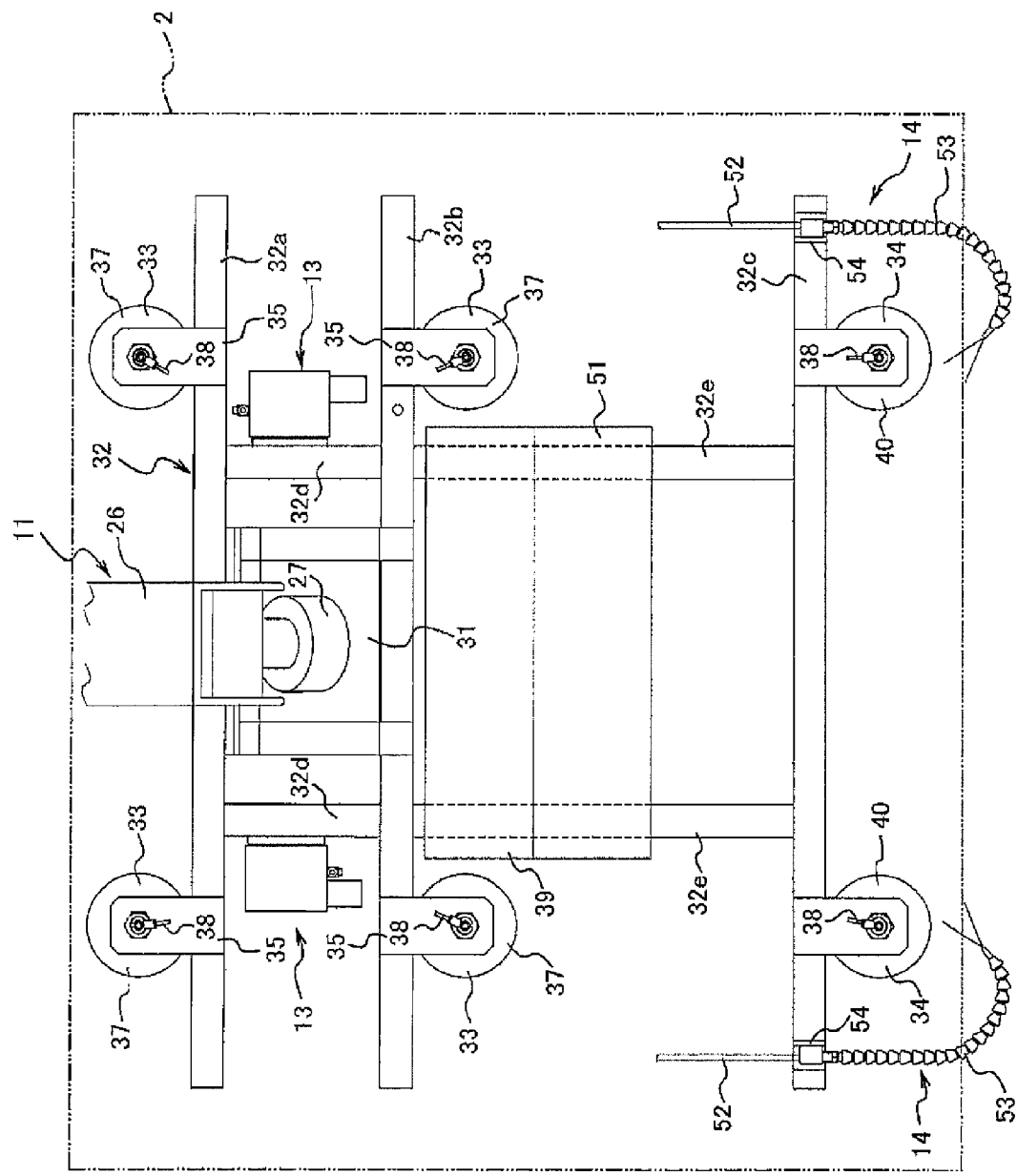
FIG. 3 is a plan view showing a suction adhesion unit attached to the distal end of the robot shown in FIG. 2.
Figure 4:
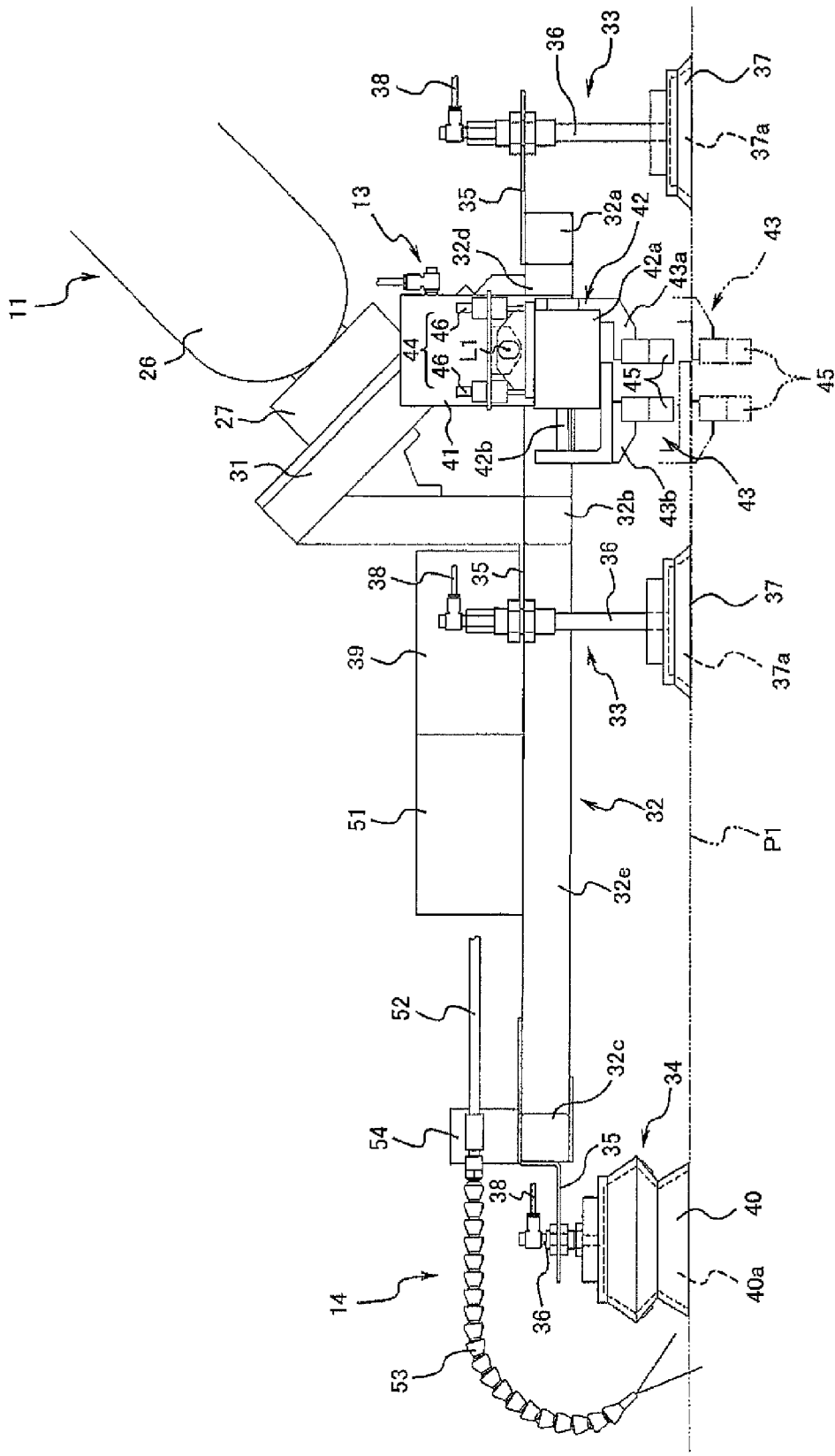
FIG. 4 is a side view of the suction adhesion unit of FIG. 3.

The robot 11 is a six-axis robot as shown in FIG. 2. Although the robot 11 is a six-axis robot in the present embodiment, the robot 11 may alternatively be, for example, a different articulated robot such as a three-axis horizontally articulated robot or a three-axis vertically articulated robot. The robot 11 includes a base 21 fixed to, for example, a floor. The base 21 includes a first arm 22. The first arm 22 is configured to be turnable around an R-axis, which is an axis vertical to the base 21. The lower end of a second arm 23 is provided at the upper end of the first arm 22. The second arm 23 is configured to be rotatable around an L-axis, which is an axis horizontal to the first arm 22. The proximal end of a third arm 24 is provided at the upper end of the second arm 23. The third arm 24 is configured to be rotatable with respect to the second arm 23 around a U-axis, which is an axis parallel to the L-axis. The third arm 24 extends along an S-axis perpendicular the U-axis. A wrist 25 is provided at the distal end of the third arm 24. The wrist 25 is configured to be rotatable with respect to the third arm 24 around the S-axis. The wrist 25 rotating in such a manner is configured such that a distal end portion 26 of the wrist 25 rotates with respect to a proximal end portion positioned at the third arm 24 side, the distal end portion 26 rotating around a B-axis perpendicular to the S-axis. Further, a distal end 27 of the wrist 25 is configured to rotate with respect to the distal end portion 26 around a T-axis perpendicular to the B-axis. Each axis is provided with an electric motor (not shown). By driving the electric motors, a turn or rotation is made around each axis. As shown in FIG. 3 and FIG. 4, the suction adhesion unit 12 is attached to the distal end 27 of the wrist 25 having the above configuration.

<Suction Adhesion Unit>

As shown in FIG. 3 and FIG. 4, the suction adhesion unit 12 includes an attachment 31, base 32, and a plurality of suction adhesion devices 33 and 34. The attachment 31 is detachably attached to the distal end 27 of the wrist 25, and is fixed to the base 32. The base 32 includes three attachment members 32a to 32c extending in the left-right direction. These three attachment members 32a to 32c are arranged in parallel so as to be spaced apart from one another in the front-rear direction. Out of the attachment members 32a to 32c, the attachment members 32a and 32b adjacent to each other are connected to each other by a pair of connecting members 32d extending in the front-rear direction, and the attachment members 32b and 32c adjacent to each other are connected to each other by a pair of connecting members 32e extending in the front-rear direction. The three attachment members 32a to 32c are such that the attachment 31 is attached in a manner to span between the two attachment members 32a and 32b positioned at the robot 11 side, i.e., at the proximal end side of the suction adhesion unit 12. The suction adhesion devices 33 and 34 are attached near the left and right ends of the attachment members 32a to 32c.

First suction adhesion devices 33 attached to the attachment members 32a and 32b each include an attachment plate 35, a suction nozzle 36, a suction pad 37, and a flexible hose 38. Each attachment plate 35 is a plate-shaped member attached to the upper surface of one of the attachment members 32a and 32b in a manner to extend forward or backward from the one attachment member. The suction nozzle 36 is attached to each attachment plate 35 at a portion protruding from the attachment member 32a or 32b. The suction nozzle 36 is a vertically extending member having a roughly cylindrical shape. The suction nozzle 36 penetrates through the attachment plate 35. The suction pad 37 is attached to the lower end of each suction nozzle 36.

The suction pad 37 is formed of an elastic material such as synthetic rubber, and has a roughly discoid shape. The suction pad 37 has a recess (not shown) such that the lower surface of the suction pad 37 is recessed upward. When the lower surface of the suction pad 37 is pressed against a glass plate 2, interior space 37a of the suction pad 37 is sealed. The interior space 37a of the suction pad 37 is connected to the inside of the suction nozzle 36. The flexible hose 38 is provided at the upper end of each suction nozzle 36. The flexible hose 38 is connected to a negative pressure feeder 39, and the interior space 37a of the suction pad 37 is connected to the negative pressure feeder 39 via the flexible hose 38 and the suction nozzle 36.

The negative pressure feeder 39 is shared by all of the suction adhesion devices 33 and 34. The negative pressure feeder 39 includes a vacuum pump and a solenoid valve which are not shown. The negative pressure feeder 39 is configured to draw air from the interior space 37a by means of the vacuum pump. By drawing the air from the interior space 37a when the lower surface of the suction pad 37 is pressed against a glass plate 2, the suction pad 37 can be caused to adhere to the glass plate 2 by suction with interleaving paper 3 in between the glass plate 2 and the suction pad 37. The negative pressure feeder 39 is configured to release the adhesion of the suction pad 37 to the glass plate 2, by blocking between the vacuum pump and the interior space 37a by means of the solenoid valve and allowing the interior space 37a to come into communication with the atmosphere. It should be noted that all of the first suction adhesion devices 33 are attached such that the lower surface (adhering surface) of each suction pad 37 is positioned substantially on a predetermined imaginary plane P1.

Meanwhile, the second suction adhesion devices 34 are attached to the attachment member 32c and are positioned at the distal end side of the suction adhesion unit 12. The fundamental configuration of the second suction adhesion device 34 is the same as that of the first suction adhesion device 33. However, the second suction adhesion device 34 is different from the first suction adhesion device 33, in that the suction nozzle 36 of the second suction adhesion device 34 is shorter than that of the first suction adhesion device 33, and the shape of a bellows-equipped suction pad 40 of the second suction adhesion device 34 is different from the shape of the suction pad 37. The bellows-equipped suction pad 40 has a stretchable bellows shape with a hollow center. The lower surface (adhering surface) of the suction pad 40 is positioned substantially on the predetermined imaginary plane P1. Interior space 40a of the bellows-equipped suction pad 40 is connected to the negative pressure feeder 39 via the suction nozzle 36 and the flexible hose 38. By drawing air from the interior space 40a of the bellows-equipped suction pad 40 with the negative pressure feeder 39 when the lower surface of the bellows-equipped suction pad 40 is pressed against a glass plate 2, the suction pad 40 can be caused to adhere to the glass plate 2 by suction with interleaving paper 3 in between the glass plate 2 and the suction pad 40, and also caused to contract, so that the lower surface of the bellows-equipped suction pad 40 is lifted upward.

A pair of holding devices 13 is attached to the proximal end side of the base 32 of the suction adhesion unit 12 having the above configuration. The pair of holding devices 13 serves to remove the interleaving paper 3 from the top of the glass plate 2. The air blowing device 14 is attached to the distal end side of the base 32. The air blowing device 14 is configured to blow air below the glass plate 2 that is in an adhered state as above.

<Holding Device>

The holding devices 13 are configured to pinch the interleaving paper 3 placed on the glass plate 2. The holding devices 13 are attached to the pair of respective connecting members 32d. The connecting members 32d connect the attachment members 32a and 32b together. As shown in FIG. 4, each holding device 13 includes an advancing/retracting mechanism 41, a piston mechanism 42, a hand 43, and an urging mechanism 44. The advancing/retracting mechanism 41 is fixed to the outer side surface of the connecting member 32d, and is configured to lift and lower the piston mechanism 42 relative to the connecting member 32d. The advancing/retracting mechanism 41 accommodates a drive circuit which is not shown. The drive circuit is configured to drive the piston mechanism 42. The piston mechanism 42, which is a holding drive unit, includes a cylinder part 42a and a rod part 42b. The cylinder part 42a is attached to the advancing/retracting mechanism 41 such that the cylinder part 42a is rotatable around an axis L1 extending in the left-right direction. The rod part 42b is inserted in the cylinder part 42a such that the rod part 42b can advance and retract in the front-rear direction. The rod part 42b is configured to advance and retract in accordance with pressure supplied from the drive circuit. The hand 43 is attached to the piston mechanism 42.

The hand 43 includes a fixed part 43a and a moving part 43b. The fixed part 43a is fixed to the cylinder part 42a, and the moving part 43b is attached to the distal end of the rod part 42b. A holding tool 45, which protrudes downward, is provided at the lower end of the fixed part 43a and at the lower end of the moving part 43b. Such a pair of holding tools 45 is formed of an elastic material such as synthetic rubber and positioned such that the holding tools 45 face each other in the front-rear direction. By causing the moving part 43b to retract toward the fixed part 43a, a part of the interleaving paper 3 is hauled in between the pair of holding tools 45. From this state, by causing the moving part 43b to come into contact with the fixed part 43a, the part of the interleaving paper 3 is held by the pair of holding tools 45. The interleaving paper 3 held by the pair of holding tools 45 is released from the holding tools 45 by causing the pair of holding tools 45 to move in opposite directions from each other (i.e., by causing the moving part 43b to move forward so as to be away from the fixed part 43a).

In each holding device 13 configured as described above, the piston mechanism 42 is rotatably attached to the advancing/retracting mechanism 41. If the piston mechanism 42 is lowered by the advancing/retracting mechanism 41 (see two-dot chain lines in FIG. 4) such that the pair of holding tools 45 is pressed against the glass plate 2, then the piston mechanism 42 becomes inclined in accordance with an inclination of the upper surface of the glass plate 2. In this manner, the distal ends of both of the holding tools 45 come into contact with the glass plate 2 regardless of the inclination of the glass plate 2. This allows the holding tool 45 of the moving part 43b side to slide on the glass plate 2 without being lifted from the glass plate 2. The urging mechanism 44 is attached to the advancing/retracting mechanism 41. The urging mechanism 44 serves to return the piston mechanism 42, which rotates in the above-described manner, to its original orientation.

The urging mechanism 44 includes a pair of pushing pins 46. The two pushing pins 46 are arranged at positions opposite to each other with respect to the rotational axis L1, such that one pin 46 is positioned at the front of the rotational axis L1 and the other pin 46 is positioned at the rear of the rotational axis L1. The two pushing pins 46 are configured to advance and retract in the up-down direction. In a state where the rod part 42b extends substantially parallel to the imaginary plane P1, the pushing pins 46 are in contact with the piston mechanism 42 and pressed against the piston mechanism 42 by springs which are not shown. Therefore, when the piston mechanism 42 rotates in one direction around the rotational axis L1, one pushing pin 46 urges the piston mechanism 42 to return to its original orientation, and when the piston mechanism 42 rotates in the other direction around the rotational axis L1, the other pushing pin 46 urges the piston mechanism 42 to return to its original orientation.

<Air Blowing Device>

The air blowing device 14 is a device for blowing air when a portion of the glass plate 2 is lifted by the second suction adhesion devices 34, such that the air is blown below the lifted portion. The air blowing device 14 includes an air supply part 51, a pair of compressed air hoses 52, and a pair of air blowing nozzles 53. The air supply part 51 includes a compressor and a solenoid valve which are not shown. The air supply part 51 is configured to supply compressed air from the compressor, and operate the solenoid valve to switch between supplying the compressed air and stopping the supply of the compressed air. The pair of compressed air hoses 52 is connected to the air supply part 51. The air blowing nozzles 53 are connected to the distal ends of the compressed air hoses 52, respectively. The proximal ends of the air blowing nozzles 53 are attached to the upper part of the respective left and right ends of the attachment member 32c via attachment members 54. The air blowing nozzles 53 extend forward from the attachment members 54, and the distal ends of the air blowing nozzles 53 are positioned forward from the second suction adhesion devices 34. The distal end side of each air blowing nozzle 53 is curved to dangle downward, such that the distal end of the air blowing nozzle 53 faces obliquely backward and downward. The distal ends of the air blowing nozzles 53 blow out compressed air supplied from the air supply part 51. When the compressed air is blown out of the air blowing nozzles 53, air space is formed between the glass plate 2 in the adhered state and the interleaving paper 3 positioned below the glass plate 2. Here, the interleaving paper 3 below the glass plate 2 is held by the clamping device 15.

<Clamping Device>

Figure 5:
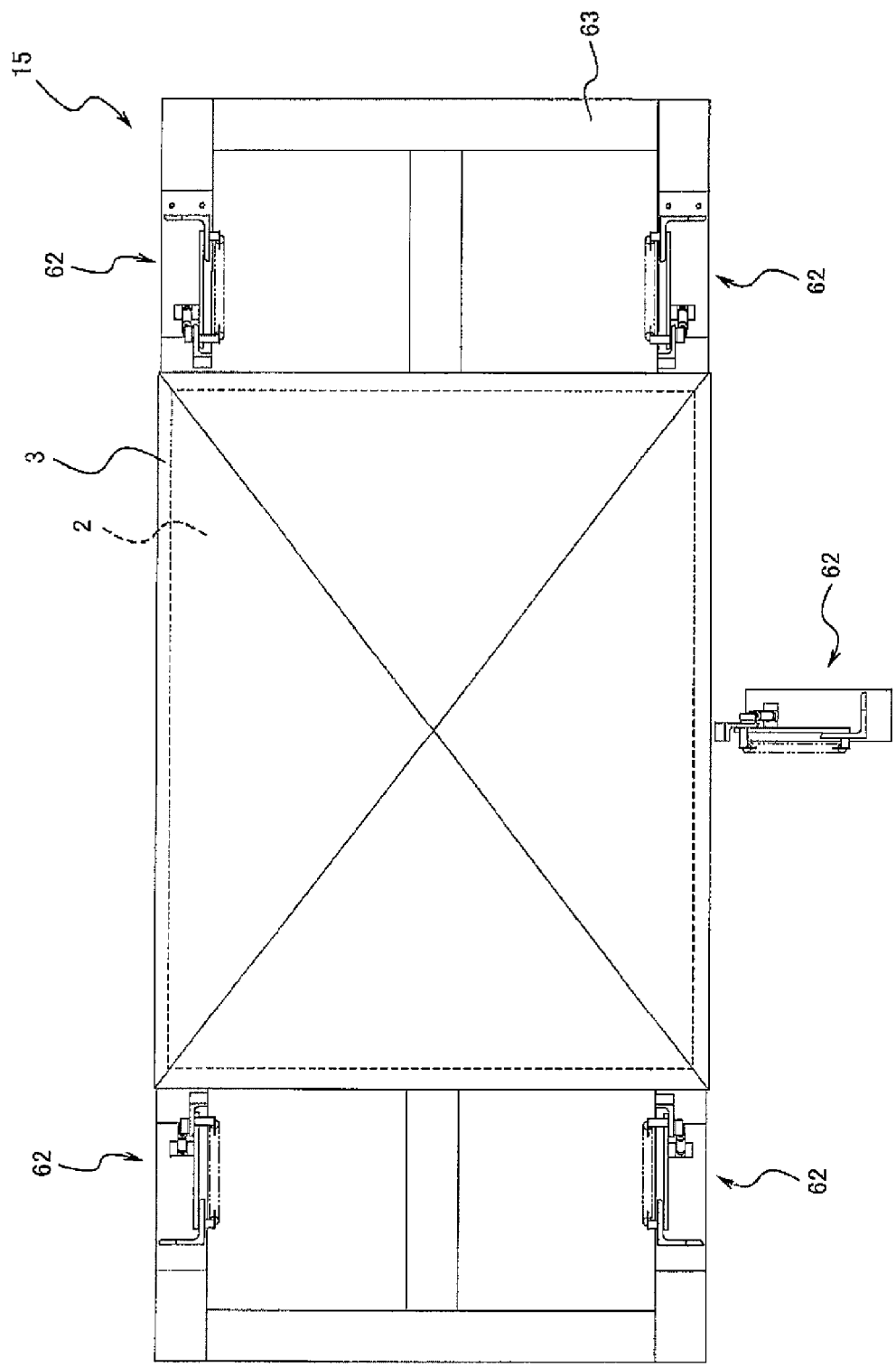
FIG. 5 is a plan view showing a clamping device included in the system of FIG. 1 for transferring a plate-shaped member with interleaving paper thereon.
Figure 6:
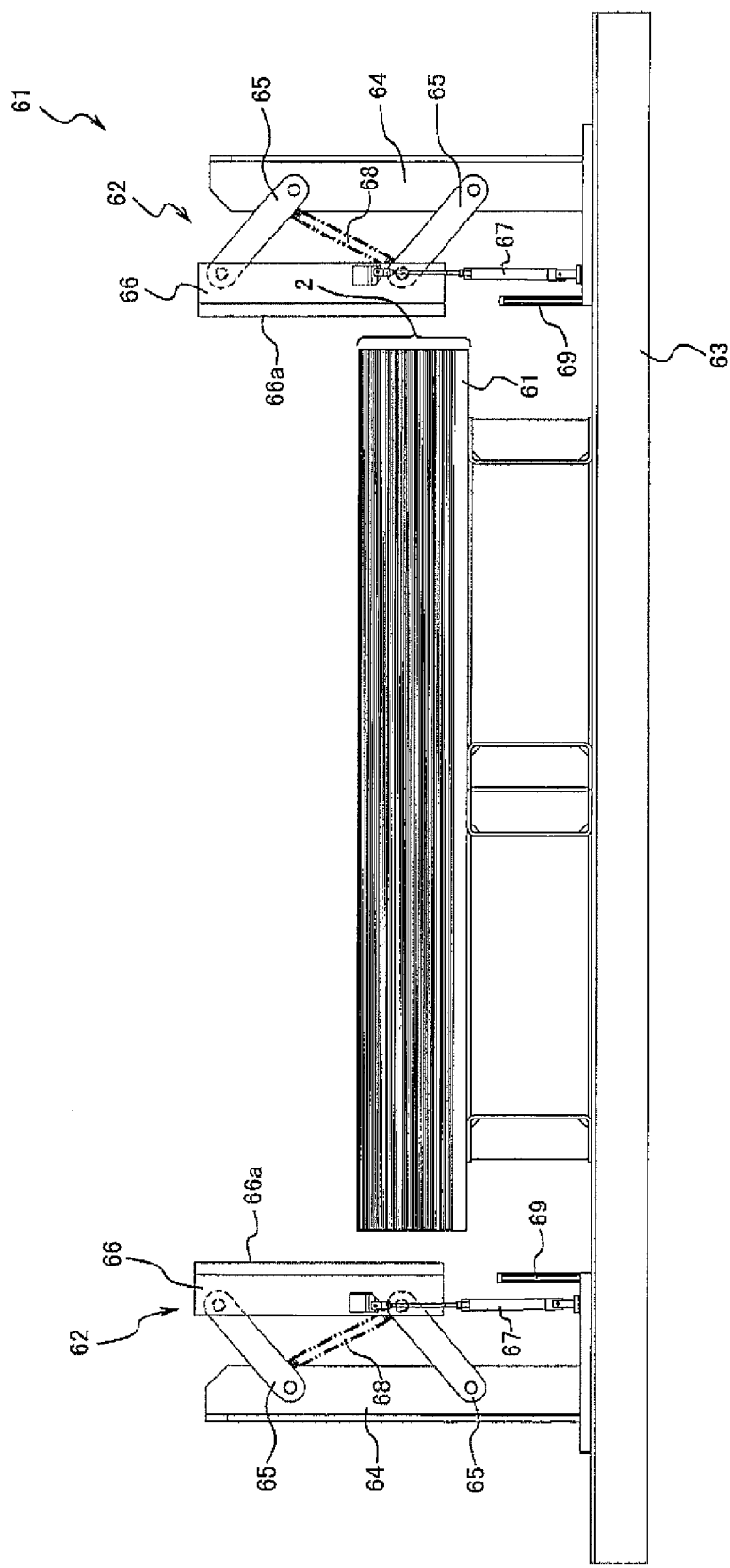
FIG. 6 is a front view of the clamping device of FIG. 5.

The clamping device 15, which is a holding device, is configured to clamp protruding portions of interleaving paper 3, the protruding portions protruding to the outside of outer edges of a plurality of stacked glass plates 2, such that the protruding portions are pushed toward the glass plates 2. As shown in FIG. 5 and FIG. 6, the clamping device 15 includes a stand 61 and a plurality of clamping mechanisms 62. The stand 61 is fixed to a base 63, and has substantially the same external dimensions as those of a glass plate 2 when seen in plan view. A stack of glass plates 2 is placed on the stand 61 (in FIG. 6, interleaving paper 3 is not shown), and the plurality of clamping mechanisms 62 (in the present embodiment, five clamping mechanisms 62) are arranged around the stand 61.

To be more specific, two clamping mechanisms 62 are arranged at both left and right sides of the stand 61 when seen in plan view. These clamping mechanisms 62 are positioned so as to push protruding portions of the interleaving paper 3 toward the left and right side surfaces of the glass plates 2. The remaining clamping mechanism 62 is disposed at the front of the stand 61 when seen in plan view. The remaining clamping mechanism 62 is positioned so as to push protruding portions of the interleaving paper 3 toward the front side surfaces of the glass plates 2. All of the five clamping mechanisms 62 which are arranged as described above include the same components, and the same components are denoted by the same reference signs.

Figure 7:
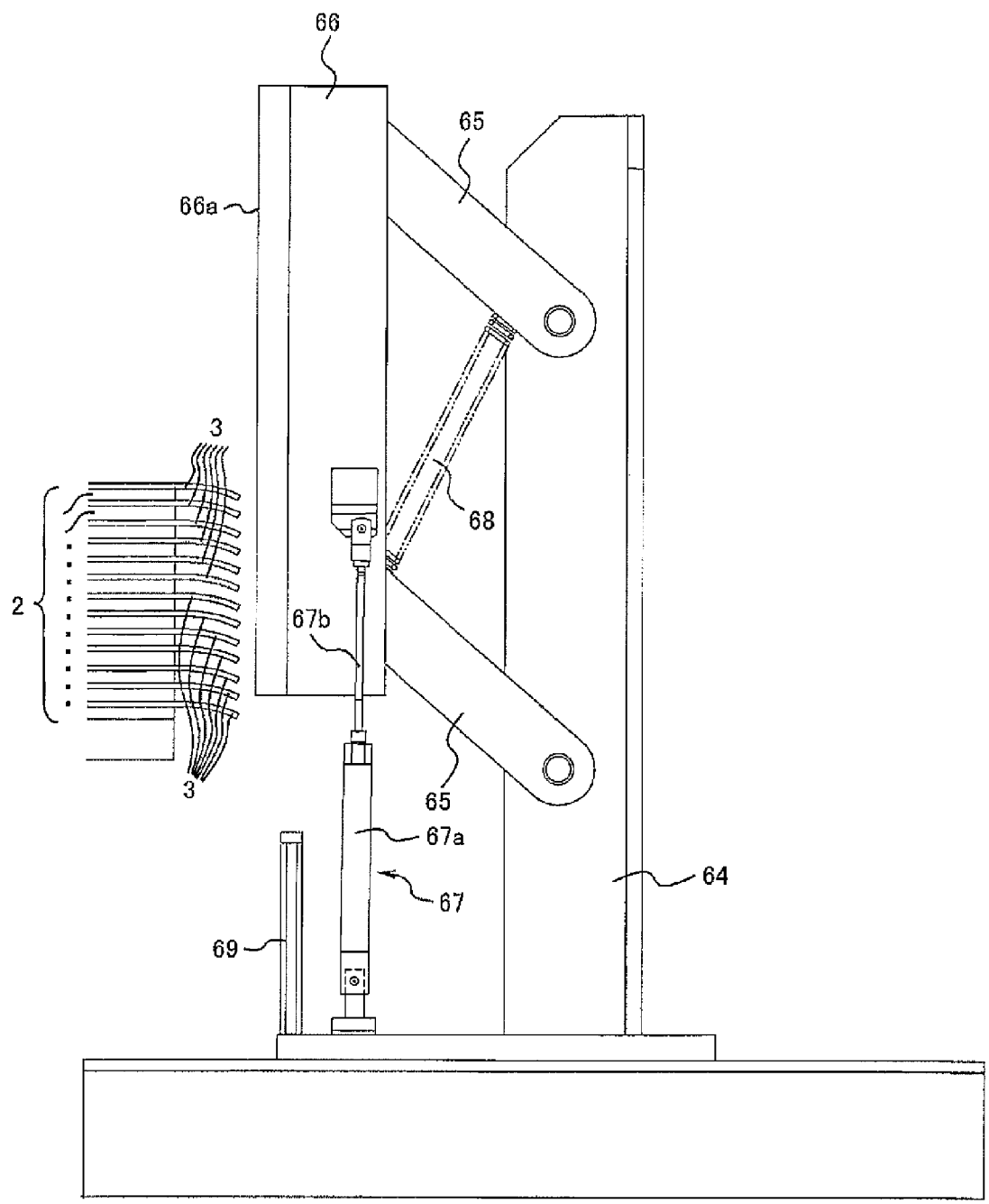
FIG. 7 is an enlarged front view showing a clamping mechanism of FIG. 6 and its vicinity in an enlarged manner.
Figure 11:
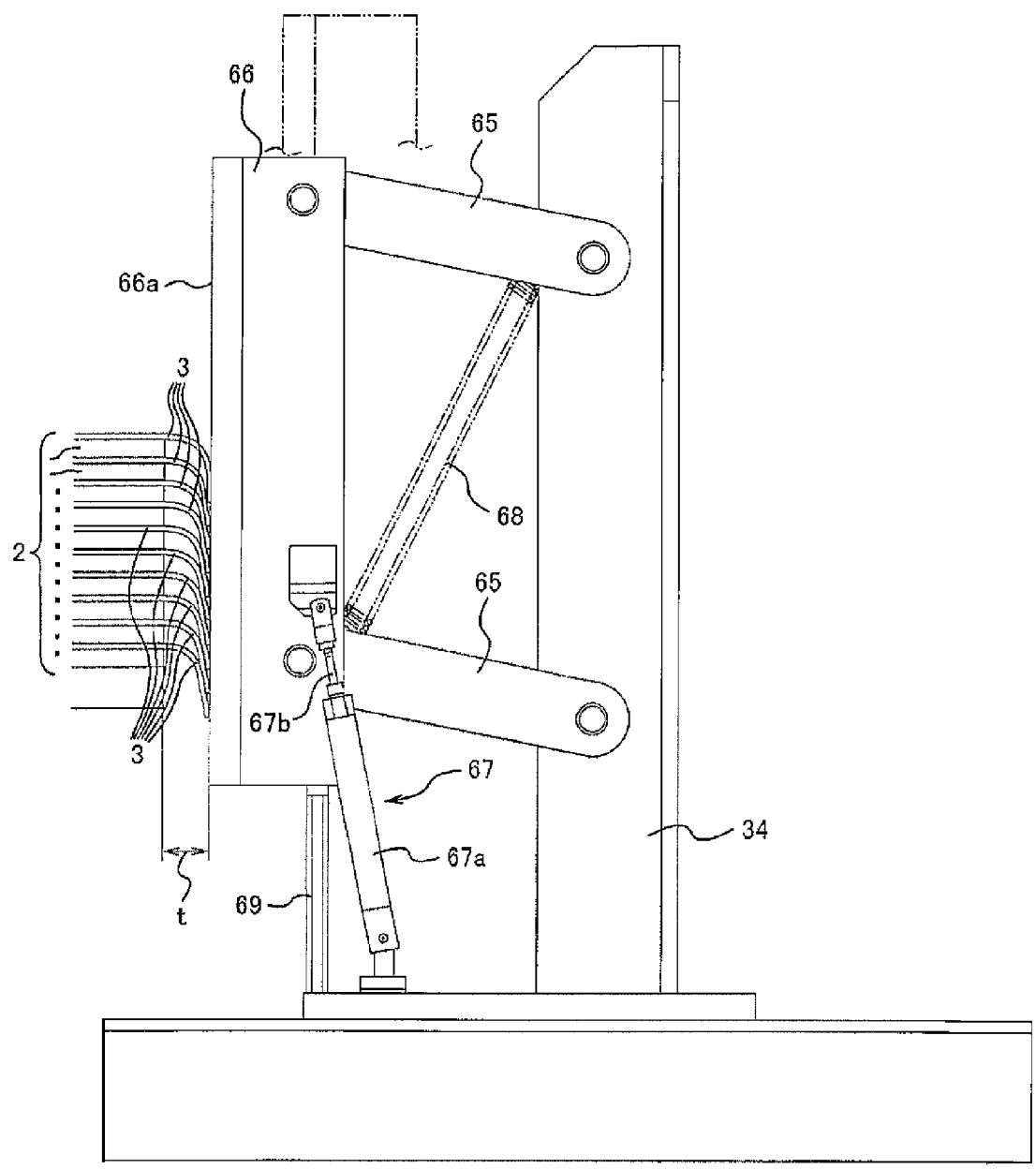
FIG. 11 is an enlarged front view showing a clamping mechanism of FIG. 10 and its vicinity in an enlarged manner.

As shown in FIG. 7, each clamping mechanism 62 includes a stationary plate 64, a pair of link plates 65, a pushing member 66, a piston 67, and a spring member 68. The stationary plate 64 is a vertically extending plate-shaped member rising from the base 63. The stationary plate 64 is positioned away from the stand 61, and the width of the stationary plate 64 is wider at the stand 61 side. The pair of link plates 65 is attached to a surface of the stationary plate 64 in such a manner that the link plates 65 can move up and down in a swinging manner. The pair of link plates 65 are plate-shaped members extending from the stationary plate 64 toward the stand 61, and positioned such that the link plates 65 are spaced apart from each other by a predetermined distance in the vertical direction and parallel to each other. The pushing member 66 is attached to the distal end side of the pair of link plates 65. The pushing member 66 is a vertically extending plate-shaped member, and its pushing surface 66a facing the stand 61 is formed of an elastic material (e.g., synthetic rubber). The pushing member 66 having such a structure and the pair of link plates 65 collectively form a parallel link, which is configured such that the pushing member 66 is lowered as the pair of link plates 65 swings and the pushing member 66 comes close to the stand 61 (see FIG. 11). The pushing surface 66a is always kept to be substantially perpendicular to the glass plates 2 stacked on the stand 61.

The piston 67 is attached to the pushing member 66 moving in the above-described manner. The piston 67 causes the pushing member 66 to move. The piston 67 includes a cylinder part 67a and a rod part 67b. The rod part 67b is inserted in the cylinder part 67a such that the rod part 67b can advance from and retract into the cylinder part 67a. The cylinder part 67a is rotatably attached to the base 63, and the rod part 67b is rotatably attached to the pushing member 66. Accordingly, when the rod part 67b is retracted, the pushing member 66 is lowered. As a result, the pushing member 66 is moved toward the stand 61 by the pair of link plates 65. A pneumatic circuit 70 (see FIG. 1) is connected to the piston 67 having the above structure. The pneumatic circuit 70 causes the piston 67 to expand and contract.

A stopper 69 is provided below the pushing member 66. The stopper 69 is contacted by the lower end of the pushing member 66 when the pushing member 66 is lowered to its lowermost position. The stopper 69 prevents the pushing member 66 from being lowered beyond the lowermost position. The pushing surface 66a of the pushing member 66 comes closest to the stand 61 at the lowermost position. Even at the lowermost position at which the pushing surface 66a of the pushing member 66 comes closest to the stand 61, the pushing surface 66a of the pushing member 66 is positioned slightly away (e.g., 5 mm to 30 mm) from side surfaces of the stacked glass plates 2, and protruding portions of the interleaving paper 3 are allowed to be in a non-pressed state between the pushing surface 66a and the side surfaces of the glass plates 2.

The spring member 68 spans between the pushing member 66 and the stationary plate 64. The spring member 68 is a tension coil spring. The spring member 68 pulls the pushing member 66 upward in a direction away from the stand 61, thereby supporting the lifting movement of the piston 67 for lifting the pushing member 66.

In the clamping device 15 configured as described above, the pushing members 66 of the clamping mechanisms 62 positioned at both left and right sides of the clamping device 15 move toward the glass plates 2, such that the left-side and right-side pushing members 66 come close to each other, thereby pushing protruding portions of the interleaving paper 3 placed on each glass plate 2 from both the left and right sides toward the glass plate 2. The pushing member 66 of the clamping mechanism 62 positioned at the front side of the clamping device 15 also moves toward the glass plates 2, thereby pushing a protruding portion of the interleaving paper 3 placed on each glass plate 2 from the front side toward the glass plate 2. By pushing the protruding portions of the interleaving paper 3 from the front, left, and right sides in such a manner, the following situation is prevented from occurring: when one glass plate 2 is lifted by the suction adhesion unit 12, the interleaving paper 3 and another glass plate 2 that are positioned below the one glass plate 2 are lifted together with the one glass plate 2. Moreover, at the time of pushing protruding portions of the interleaving paper 3, a gap t is formed between the pushing surface 66a and side surfaces of the glass plates 2 so that the protruding portions of the interleaving paper 3 will be suppressed from being pressed against the side surfaces of the glass plates 2. This makes it possible to readily lift a glass plate 2 while suppressing the interleaving paper 3 below the glass plate 2 from being taken away together with the glass plate 2. The glass plate 2 thus lifted is transferred onto the conveyor 4 disposed adjacent to the robot 11, and then the adhesion of the suction pads to the glass plate 2 is released. After the adhesion is released, the interleaving paper 3 on the glass plate 2 is held by the holding devices 13, and then discarded onto the interleaving paper storage tool 16.

<Interleaving Paper Storage Tool>

Figure 8:
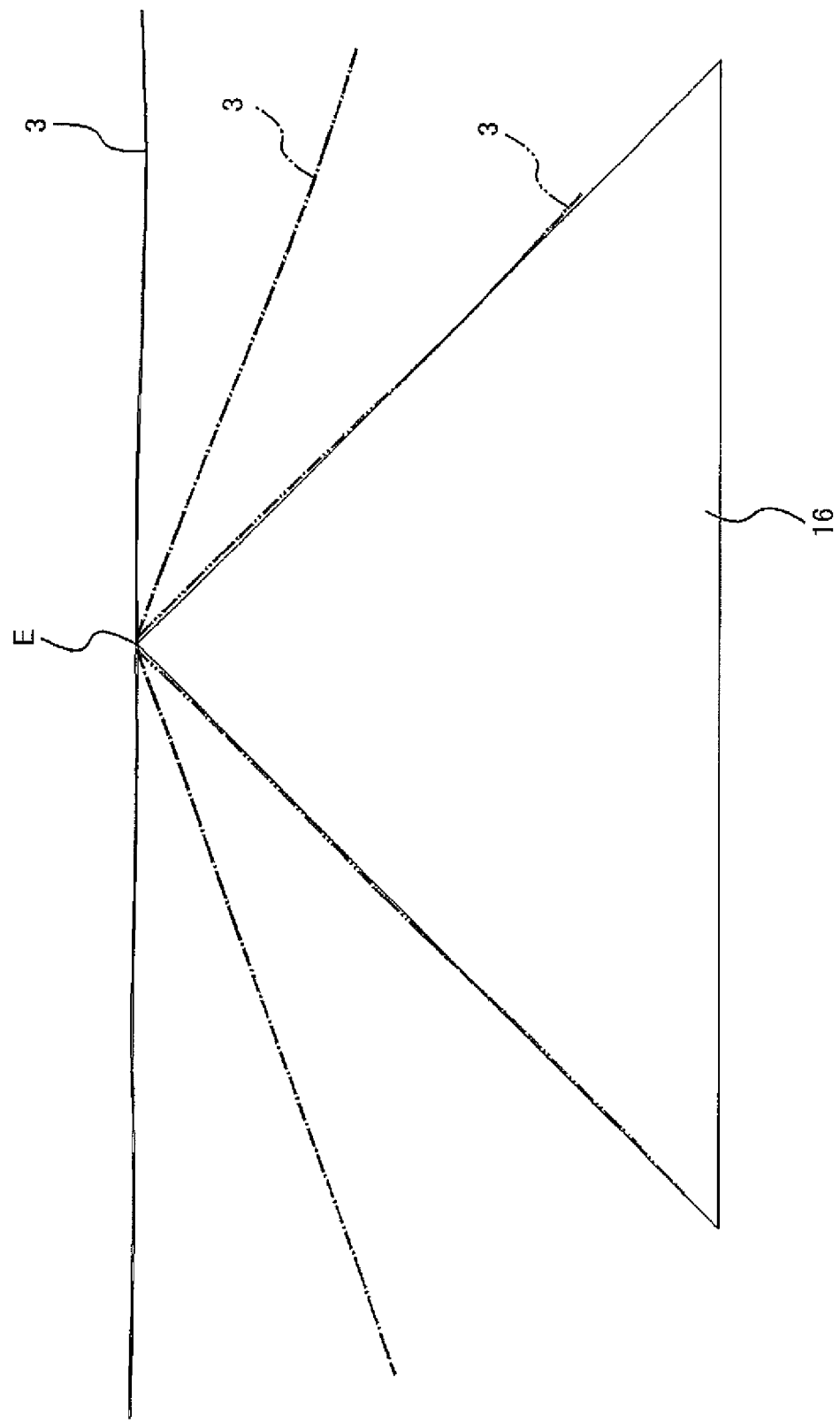
FIG. 8 is a front view of an interleaving paper storage tool included in the system of FIG. 1 for transferring a plate-shaped member with interleaving paper thereon.

The interleaving paper storage tool 16 is a tool for storing the interleaving paper 3 thereon. The interleaving paper storage tool 16 is formed to project upward such that the interleaving paper storage tool 16 has at least one straight ridge E. In the present embodiment, as shown in FIG. 8, the vertical cross section of the interleaving paper storage tool 16 has a roughly triangular shape. The interleaving paper storage tool 16 is formed such that, when the interleaving paper 3 in a spread state falls onto the interleaving paper storage tool 16 from above the interleaving paper storage tool 16, the interleaving paper 3 is bent along the ridge E (see dashed-dotted lines in FIG. 8) and then placed on the interleaving paper storage tool 16 in an inverted V-shape (see two-dot chain lines in FIG. 8). Other pieces of interleaving paper 3 can be stacked over the interleaving paper 3 placed on the interleaving paper storage tool 16. Thus, a plurality of pieces of interleaving paper 3 can be stored in a stack on the interleaving paper storage tool 16.

<Controller>

Figure 9:
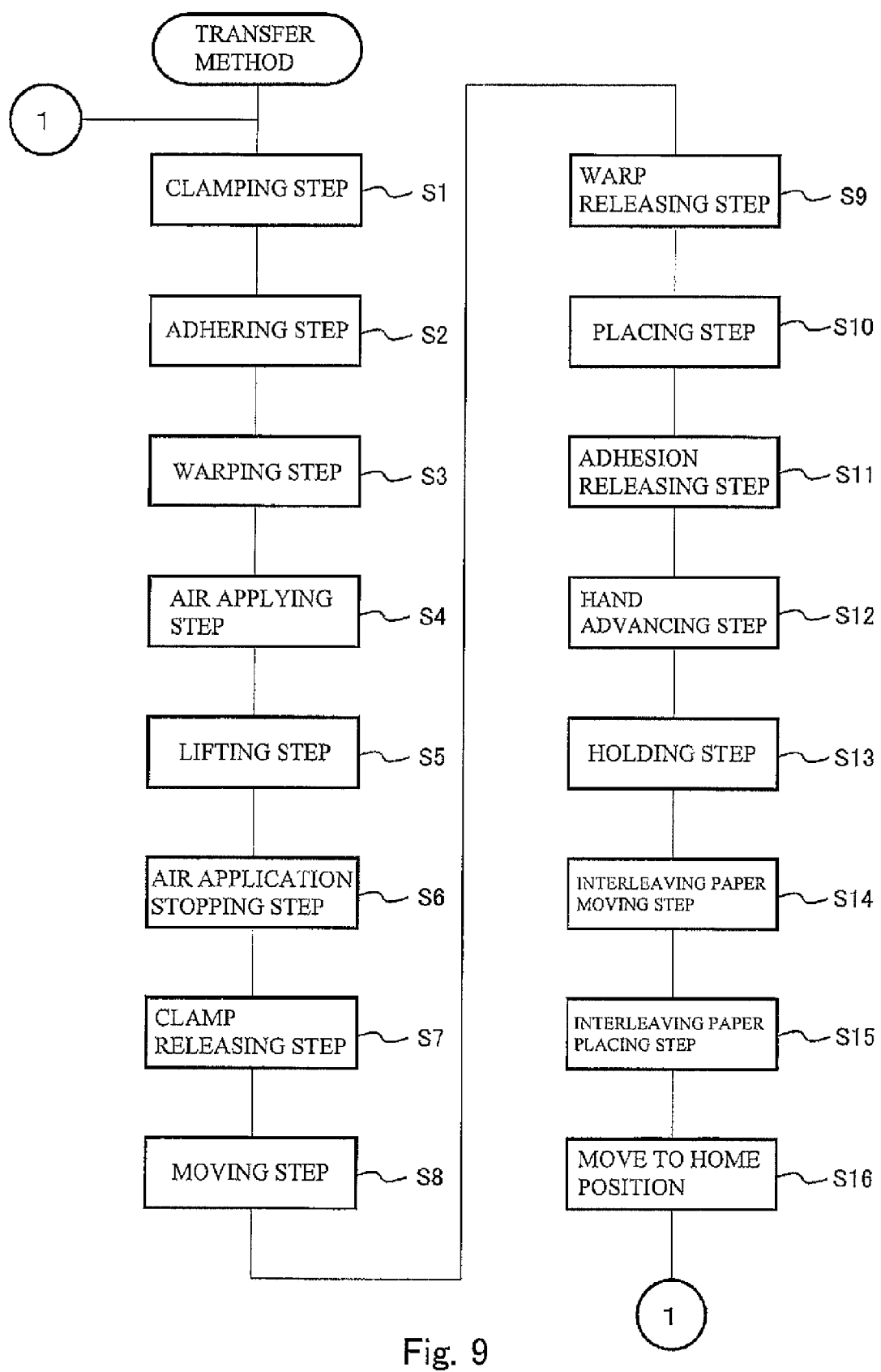
FIG. 9 is a flowchart showing steps of transferring a glass plate with interleaving paper thereon, the steps being performed by the system of FIG. 1 for transferring a plate-shaped member with interleaving paper thereon.

Each of the robot 11, the suction adhesion unit 12, the holding devices 13, the air blowing device 14, and the clamping device 15 configured as described above is electrically connected to the controller 17 (see FIG. 1). The operations of these devices are controlled by the controller 17. Described below with reference to a flowchart in FIG. 9 is a method by which the controller 17 controls the operation of each component included in the devices 11 to 15, thereby transferring, to the conveyor 4 by means of the transfer system 1, an uppermost glass plate 2 from a plurality of glass plates 2 that are stacked with interleaving paper 3 placed on the upper surface of each glass plate 2.

<Transfer Method Executed by System for Transferring Plate-Shaped Member with Interleaving Paper Thereon>

Figure 10:
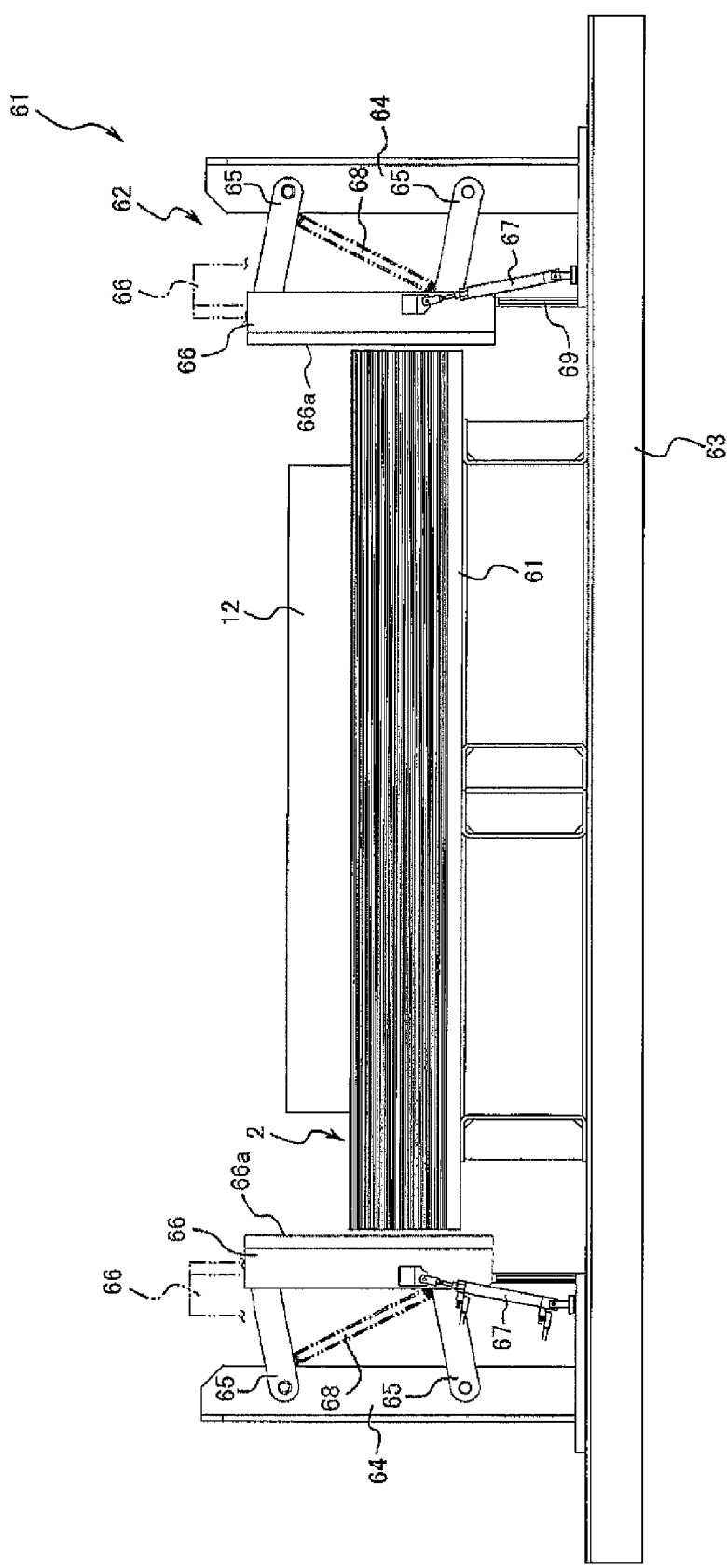
FIG. 10 is a front view showing a state where pushing members of clamping mechanisms in the clamping device of FIG. 5 are lowered.

When the controller 17 receives, from input means which is not shown, an instruction to transfer a glass plate 2, the controller 17 performs step S1. In step S1, which is a clamping step, the controller 17 controls the pneumatic circuit 70 to cause the piston 67 to contract. As a result, the pushing member 66 lowers and moves toward the stand 61. Protruding portions of respective pieces of interleaving paper 3, the protruding portions protruding from the glass plates 2, are bent downward by the pushing member 66. In this manner, the protruding portions of the respective pieces of interleaving paper 3 are pushed toward the plurality of stacked glass plates 2 (see FIG. 10 and FIG. 11). This control is performed on all of the clamping mechanisms 62 at the same time. As a result, protruding portions of the pieces of interleaving paper 3, the protruding portions protruding from the left, right, and front sides of the plurality of stacked glass plates 2, are pushed toward the side surfaces of the glass plates 2.

In parallel with the operation of pushing the interleaving paper 3, the controller 17 controls the operation of each electric motor of the robot 11 to move the suction adhesion unit 12 to be positioned above a glass plate 2. At the time, the controller 17 controls the operation of each electric motor of robot 11 such that the imaginary plane P1 of the suction adhesion unit 12 substantially coincides with the upper surface of the glass plate 2, and such that the attachment members 32a to 32c are positioned parallel to the front surface of the glass plate 2. When the interleaving paper 3 has been pushed and the suction adhesion unit 12 has been moved as described above, the controller 17 advances to step S2.

In step S2 which is a suction-adhering step, the controller 17 controls the operation of each electric motor of the robot 11, thereby causing the suction pads 37 and 40 to be lightly pressed against the uppermost glass plate 2. At the time, the interleaving paper 3 is on the glass plate 2, and the suction pads 37 and 40 are pressed against the glass plate 2 with the interleaving paper 3 in between the glass plate 2 and the suction pads 37 and 40. After the suction pads 37 and 40 are pressed against the glass plate 2, the controller 17 operates the solenoid valve of the negative pressure feeder 39 to cause the suction pads 37 and 40 to adhere to the glass plate 2 by suction. When the suction pads 37 and 40 have adhered to the glass plate 2, the controller 17 advances to step S3.

In step S3 which is a warping step, the controller 17 operates the solenoid valve of the negative pressure feeder 39 to further draw air from the interior space 40a of each bellows-equipped suction pad 40, thereby causing the bellows-equipped suction pads 40 to contract. When the bellows-equipped suction pads 40 contract, the vicinity of a portion of the glass plate 2 to which the bellows-equipped suction pads 40 adhere by suction, i.e., a front outer edge portion of the glass plate 2, is lifted and thereby the glass plate 2 is warped (see FIG. 12). At the time, the interleaving paper 3 below the warped glass plate 2 is pushed down by the clamping device 15. This prevents the interleaving paper 3 from being taken away together with the glass plate 2. When the glass plate 2 has been warped, the controller 17 advances to step S4.

Figure 12:
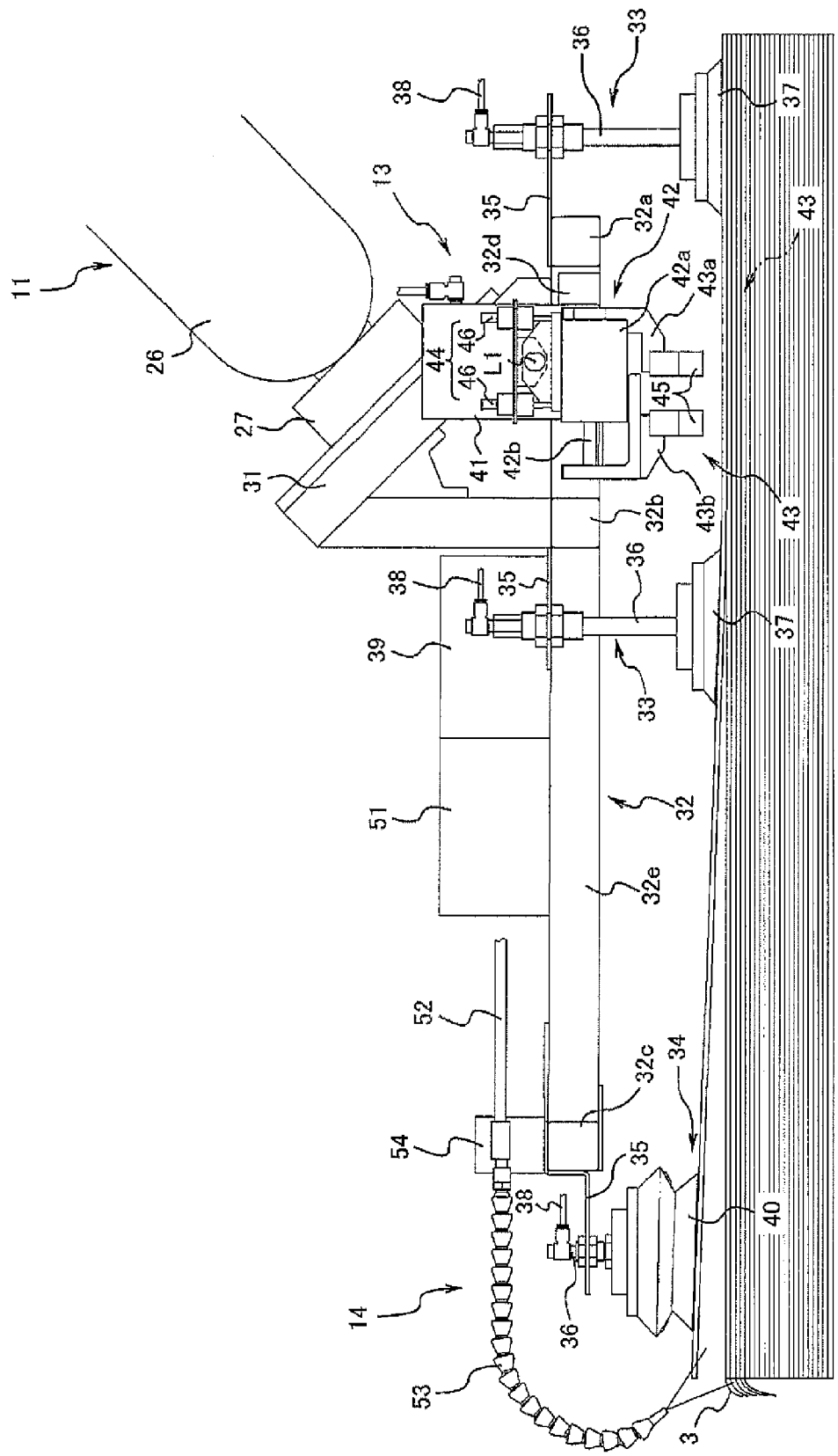
FIG. 12 is a side view showing a state where the suction adhesion unit of FIG. 4 adheres to a glass plate by suction and warps the glass plate.

In step S4 which is an air blowing step, the controller 17 controls the operation of the solenoid valve of the air supply part 51 to cause compressed air to flow out of the distal ends of the respective air blowing nozzles 53 (see FIG. 12). As a result, the compressed air is blown out of the air blowing nozzles 53 positioned at the front side of the warped glass plate 2, and air space is formed between the warped glass plate 2, and the interleaving paper 3 and another glass plate 2 that are positioned below the warped glass plate 2. At the time of lifting the glass plate 2 in the adhered state, the formation of the air space and the pushing function of the clamping device 15 make it possible to readily remove the glass plate 2 from the interleaving paper 3 and the other glass plate 2 that are positioned below the glass plate 2. When blowing of the compressed air has been performed, the controller 17 advances to step S5.

In step S5 which is a lifting step, the controller 17 controls the operation of each electric motor of the robot 11 to lift the suction adhesion unit 12, thereby lifting the glass plate 2. At the time of lifting the glass plate 2, the controller 17 lifts the glass plate 2 in a substantially vertical direction so that the glass plate 2 will not come into contact with any pushing member 66. When the glass plate 2 has been lifted, the controller 17 advances to step S6. In step S6 which is an air blowing stopping step, when the glass plate 2 in the adhered state is lifted and removed from the interleaving paper 3 and the other glass plate 2 that are positioned below the glass plate 2, the controller 17 controls the operation of the solenoid valve of the air supply part 51 to stop blowing the compressed air. When the blowing of the compressed air has been stopped, the controller 17 advances to step S7.

In step S7 which is a clamp releasing step, the controller 17 controls the pneumatic circuit 70 to cause each piston 67 to expand. Accordingly, each pushing member 66 is lifted to move away from the stand 61, and thereby the interleaving paper 3 is released from being pushed. When the interleaving paper 3 has been released from being pushed, the controller 17 advances to step S8. In step S8 which is a moving step, the glass plate 2 in the adhered state is moved to be positioned above the conveyor 4, with the interleaving paper 3 placed on the glass plate 2. When the glass plate 2 has been moved to be positioned above the conveyor 4, the controller 17 advances to step S9.

In step S9 which is a warp releasing step, the controller 17 operates the solenoid valve of the negative pressure feeder 39 to release the adhesion of the bellows-equipped suction pads 40. As a result, the warp of the glass plate 2 is eliminated, and the glass plate 2 becomes flat. When the adhesion of the bellows-equipped suction pads 40 has been released, the controller 17 advances to step S10. In step S10 which is a placing step, the controller 17 controls the operation of each electric motor of the robot 11 to lower the glass plate 2 in the adhered state, such that the glass plate 2 is placed onto the conveyor 4. When the glass plate 2 has been placed on the conveyor 4, the controller 17 advances to step S11.

In step S11 which is an adhesion releasing step, the controller 17 operates the solenoid valve of the negative pressure feeder 39 to release the adhesion of the suction pads 37. Then, the controller 17 controls the operation of each electric motor of the robot 11 to lift the suction adhesion unit 12, such that the suction adhesion unit 12 is moved slightly away from the glass plate 2. When the suction adhesion unit 12 has been moved away from the glass plate 2, the controller 17 advances to step S12.

In step S12 which is a hand advancing step, the controller 17 controls the operation of the advancing/retracting mechanism 41 to cause the hand 43 to advance, i.e., to lower, until the lower ends of the pair of holding tools 45 come into contact with the glass plate 2 with the interleaving paper 3 in between the glass plate 2 and the lower ends. At the time, if the base 32 is inclined in the front-rear direction relative to the glass plate 2, then the piston mechanism 42 rotates with respect to the advancing/retracting mechanism 41 in accordance with the inclination so that the orientation of the piston mechanism 42 will be kept substantially parallel to the glass plate 2. This makes it possible to cause both of the pair of holding tools 45 to assuredly come into contact with the glass plate 2 even if the base 32 is inclined relative to the glass plate 2, and also makes it possible to cause the pair of holding tools 45 to move relative to each other along the upper surface of the glass plate 2. When the hand 43 has been lowered and the pair of holding tools 45 has come into contact with the glass plate 2, the controller 17 advances to step S13.

In step S13 which is a holding step, the controller 17 controls the operation of the drive circuit to retract the piston mechanism 42. As a result of retracting the piston mechanism 42, the moving part 43*b* of the hand 43 moves toward the fixed part 43*a*. Consequently, the holding tool 45 of the moving part 43*b* moves along the upper surface of the glass plate 2 toward the holding tool 45 of the fixed part 43*a* while dragging the interleaving paper 3 positioned below the holding tool 45 of the moving part 43*b*. Meanwhile, the holding tool 45 of the fixed part 43*a* is holding the interleaving paper 3. Accordingly, when the holding tool 45 of the moving part 43*b* moves toward the holding tool 45 of the fixed part 43*a*, a portion of the interleaving paper 3 is hauled in between the pair of holding tools 45. Then, when the holding tools 45 come into contact with each other, the pair of holding tools 45 pinches and holds the hauled portion of the interleaving paper. When the interleaving paper 3 has been pinched by the two left-side and right-side holding devices 13 in such a manner, the controller 17 advances to step S14.

In step S14 which is an interleaving paper moving step, the controller 17 controls the operation of each electric motor of the robot 11 to move the suction adhesion unit 12, thereby moving the pinched interleaving paper 3 onto the interleaving paper storage tool 16. At the time, the controller 17 moves the suction adhesion unit 12 to move the interleaving paper 3 such that the interleaving paper 3 is pulled toward the proximal end side of the conveyor 4, at which side the interleaving paper 3 is pinched by the holding devices 13. As a result, the pinched interleaving paper 3 can be moved in a spread state without causing the interleaving paper 3 to become rolled up or greatly undulated. The controller 17 moves the suction adhesion unit 12 in the above manner, and when the center line of the interleaving paper 3 has become positioned above the ridge E of the interleaving paper storage tool 16 (see FIG. 13A), the controller 17 advances to step S15.

In step S15 which is an interleaving paper placing step, the controller 17 controls the operation of the drive circuit to cause the piston mechanism 42 to move forward. As a result, the pair of holding tools 45 in contact with each other move away from each other, and thereby the holding of the interleaving paper 3 is released. Consequently, the interleaving paper 3 in a spread state falls onto the interleaving paper storage tool 16 (see FIG. 13B). Since the center line of the interleaving paper 3 substantially coincides with the ridge E of the interleaving paper storage tool 16, the interleaving paper 3 is placed onto the interleaving paper storage tool 16 in a manner that the interleaving paper 3 is bent to be in a substantially inverted V-shape such that the interleaving paper 3 is bisected along the center line. Thus, when the interleaving paper 3 is placed onto the interleaving paper storage tool 16, the interleaving paper 3 in a spread state falls onto the interleaving paper storage tool 16 and is bent such that the interleaving paper 3 is bisected. This makes it possible to place the interleaving paper 3 on the interleaving paper storage tool 16 without causing the interleaving paper 3 to become rolled up or greatly undulated (i.e., without causing the interleaving paper 3 to become wrinkled). After the interleaving paper 3 is placed on the interleaving paper storage tool 16, another piece of interleaving paper 3 can be placed over the interleaving paper 3 on the interleaving paper storage tool 16 in the same manner. Thus, a plurality of pieces of interleaving paper 3 can be placed on the interleaving paper storage tool 16. This makes it possible to make the interleaving paper storage space compact. The interleaving paper 3 is placed on the interleaving paper storage tool 16 in a spread state and also in a state where the interleaving paper 3 is bent along the ridge E. This makes it possible to prevent the interleaving paper 3 from, for example, slipping down from the interleaving paper storage tool 16 so that the floor or the like will not be littered with the interleaving paper 3. When the interleaving paper 3 has been placed on the interleaving paper storage tool 16, the controller 17 advances to step S16.

In step S16, the controller 17 controls the operation of each electric motor of the robot 11 to return the robot 11 to its home position. In a case where the robot 11 continues transferring another glass plate 2 to the conveyor 4 after returning to the home position, the controller 17 returns to step S1.

In the transfer system 1, which transfers a glass plate 2 with interleaving paper 3 thereon in the above-described transfer method, when the glass plate 2 is brought into an adhered state and lifted, protruding portions of the interleaving paper 3 are pushed down by the clamping device 15. This makes it possible to prevent the interleaving paper 3 and another glass plate 2 that are positioned below the adhered glass plate 2 from being taken away together with the adhered glass plate 2. That is, only the uppermost glass plate 2 and the interleaving paper 3 placed thereon, which are to be transferred, can be transferred. This makes it possible to prevent the following situations from occurring: a situation where the glass plate 2 below the uppermost glass plate is taken away together with the uppermost glass plate and then falls from the uppermost glass plate due to its own weight to become damaged; and a situation where the interleaving paper 3 below the uppermost glass plate is taken away together with the uppermost glass plate and then falls from the uppermost glass plate to litter the floor or the like. In the transfer system 1, immediately after the glass plate 2 is placed on the conveyor 4 by means of the suction adhesion unit 12, the holding devices 13 can be caused to remove the interleaving paper 3 from the top of the glass plate 2 without returning the robot 11 (suction adhesion unit 12) to the home position. This makes it possible to reduce a time required for transferring one glass plate 2 and removing the interleaving paper 3 from the top of the one glass plate 2.

Further, in the transfer system 1, the pair of holding tools 45 swings in accordance with an inclination of the surface of the glass plate 2. This makes it possible to allow the pair of holding tools 45 to assuredly come into contact with the surface of the glass plate 2, and to allow the pair of holding tools 45 to assuredly hold the interleaving paper 3. Although the lower ends of the suction pads 37 and 40 and the pair of holding tools 45 are pressed against the glass plate 2, the glass plate 2 can be prevented from being damaged since these lower ends are pressed against the glass plate 2 with the interleaving paper 3 in between the glass plate 2 and the lower ends. In addition, the lower ends of the suction pads 37 and 40 and the pair of holding tools 45 are each formed of an elastic material. Also for this reason, the glass plate 2 can be prevented from being damaged.

<Other Embodiments>

In the transfer system 1 according to the present embodiment, the pushing step is performed prior to the air blowing step and the warping step. However, these steps are not necessarily performed in such an order. For example, the pushing step may be performed after the warping step, or alternatively, the pushing step may be performed after the air blowing step. Although the suction-adhering step and the holding step are separately performed, these steps may be performed at the same time. That is, at the time of performing the suction-adhering step, the advancing/retracting mechanism 41 may be driven to lower the hand 43 to cause the hand 43 to hold the interleaving paper 3 in advance, and thereafter, the suction pads 37 and 40 may be caused to adhere to the glass plate 2 by suction. In this case, after the glass plate 2 is placed onto the conveyor 4, the interleaving paper 3 can be removed from the top of the glass plate 2 by merely lifting the suction adhesion unit 12.

At the time of pushing protruding portions of the interleaving paper 3, it is not necessary for the pushing member 66 to lower obliquely downward toward the stand 61. Instead, the pushing member 66 may be configured to move horizontally toward the stand 61. Moreover, the number of clamping mechanisms 62 is not limited to five, but may be two to four, or six or more. Further, the installation positions of the clamping mechanisms 62 are not limited to the positions in the above description. Still further, the vertical cross section of the interleaving paper storage tool 16 is not limited to a roughly triangular shape, but may be a roughly trapezoidal shape.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

REFERENCE SIGNS LIST 1 transfer system
2 glass plate
3 interleaving paper
11 robot
12 suction adhesion unit
13 holding device
14 air blowing device
15 clamping device
16 interleaving paper storage tool
17 controller
33 first suction adhesion device
34 second suction adhesion device
37 suction pad
40 bellows-equipped suction pad
41 advancing/retracting mechanism
42 piston mechanism
43 hand
45 holding tool
62 clamping mechanism
66 pushing member

The invention claimed is:
1. A system for transferring a plate-shaped member with interleaving paper thereon, the system being configured to transfer an uppermost plate-shaped member from a plurality of plate-shaped members that are stacked with pieces of inter- leaving paper placed on respective upper surfaces of the plate-shaped members, the system comprising:

- a suction adhesion device including a plurality of suction pads configured to adhere to a surface of the uppermost plate-shaped member by suction with the interleaving paper in between the surface and the suction pads;
- an air blowing device configured to blow air between the adhered plate-shaped member and the plate-shaped member that is positioned below the adhered plate-shaped member;
- a robot configured to move the suction adhesion device;
- a pushing device disposed at a side of the stacked plate-shaped members, the pushing device including a pushing member configured to move toward the plate-shaped members; and
- a controller configured to control operations of the pushing device, the suction adhesion device, the air blowing device, and the robot, wherein
- the plurality of suction pads are arranged such that adhering surfaces thereof are positioned substantially on a predetermined imaginary plane,
- the suction pad that is disposed at a forefront position is configured such that the adhering surface thereof moves upward relative to the imaginary plane, and
- the controller is configured to:
- after causing the plurality of suction pads to adhere to the plate-shaped member by suction, cause the suction pad disposed at the forefront position to move upward to warp a portion of an outer edge of the plate-shaped member;
- cause the air blowing device to blow air between the warped portion and the plate-shaped member that is positioned below the warped portion, and then cause the suction adhesion device to be lifted upward; and
- at least over a period from before the suction adhesion device is lifted until the plate-shaped member is lifted, cause the pushing member to push protruding portions of the respective pieces of interleaving paper, the protruding portions protruding from the side of the plate-shaped members.

2. The system for transferring a plate-shaped member with interleaving paper thereon according to claim 1, the system comprising

- a holding device provided at the suction adhesion device, wherein the holding device includes:
  - a pair of holding tools configured to move relative to each other along the surface of the plate-shaped member; and
  - a holding drive unit configured to cause the pair of holding tools to move relative to each other, and
- the controller is configured to control the holding drive unit to cause the pair of holding tools to move relative to each other on the plate-shaped member, such that the holding tools hold the interleaving paper that is on the plate-shaped member.

3. The system for transferring a plate-shaped member with interleaving paper thereon according to claim 2, wherein

- the holding device includes an advancing/retracting mechanism configured to cause the pair of holding tools to advance toward and retract from the surface of the plate-shaped member, and
- the pair of holding tools is swingably attached to the advancing/retracting mechanism.

4. The system for transferring a plate-shaped member with interleaving paper thereon according to claim 2, wherein

- the pair of holding tools is configured such that distal ends of the respective holding tools come into contact with the surface of the plate-shaped member with the interleaving paper in between the surface and the distal ends, and
- the distal ends of the pair of holding tools are formed of an elastic material.

5. The system for transferring a plate-shaped member with interleaving paper thereon according to claim 2, the system comprising

- an interleaving paper storage tool projecting upward such that the interleaving paper storage tool has at least one straight ridge, wherein
- the controller is configured to cause the robot to move the suction adhesion device such that a center line of the interleaving paper that is held by the holding device is positioned above the ridge of the interleaving paper storage tool, and then cause one of the holding tools to move away from the other holding tool such that the interleaving paper is released from the holding device.

6. The system for transferring a plate-shaped member with interleaving paper thereon according to claim 2, wherein

- the pair of holding tools is configured such that the holding tools come close to each other while lowering downward.

7. A transfer method executed by a system for transferring a plate-shaped member with interleaving paper thereon, the system being configured to transfer an uppermost plate-shaped member from a plurality of plate-shaped members that are stacked with pieces of interleaving paper placed on respective upper surfaces of the plate-shaped members, the system including: a suction adhesion device including a plurality of suction pads configured to adhere to a surface of the uppermost plate-shaped member by suction with the interleaving paper in between the surface and the suction pads; an air blowing device configured to blow air between the adhered plate-shaped member and the plate-shaped member that is positioned below the adhered plate-shaped member; a robot configured to move the suction adhesion device; a pushing device disposed at a side of the stacked plate-shaped members, the pushing device including a pushing member configured to move toward the plate-shaped members; and a controller configured to control operations of the pushing device, the suction adhesion device, the air blowing device, and the robot, wherein the plurality of suction pads are arranged such that adhering surfaces thereof are positioned substantially on a predetermined imaginary plane, and the suction pad that is disposed at a forefront position is configured such that the adhering surface thereof moves upward relative to the imaginary plane, the transfer method comprising:

- a suction-adhering step in which the controller causes the plurality of suction pads to adhere to the plate-shaped member by suction with the interleaving paper in between the plate-shaped member and the suction pads;
- a warping step in which the controller causes the suction pad disposed at the forefront position to move upward to warp a portion of an outer edge of the plate-shaped member;
- an air blowing step in which the controller causes the air blowing device to blow air between the warped portion of the outer edge and the plate-shaped member that is positioned below the warped portion;
- a pushing step in which the controller causes the pushing member to push protruding portions of the respective pieces of interleaving paper, the protruding portions protruding from the side of the plate-shaped members; and a lifting step in which the controller causes the robot to lift the suction adhesion device upward after the air blowing step and the pushing step, wherein the pushing step is performed at least until the suction adhesion device is lifted upward in the lifting step.

8. The transfer method executed by the system for transferring a plate-shaped member with interleaving paper thereon according to claim 7, wherein the pushing step is performed prior to the air blowing step.

9. The transfer method executed by the system for transferring a plate-shaped member with interleaving paper thereon according to claim 8, wherein the pushing step is performed prior to the warping step.

10. The transfer method executed by the system for transferring a plate-shaped member with interleaving paper thereon according to claim 8, wherein the system includes: a holding device provided at the suction adhesion device, the holding device being configured to hold the interleaving paper on the surface of the plate-shaped member; and an interleaving paper storage tool projecting upward such that the interleaving paper storage tool has at least one straight ridge, the transfer method comprising:

a moving step in which the controller causes the robot to move, to a predetermined position, the plate-shaped member that has been lifted in the lifting step;

a placing step in which the controller causes the plurality of suction pads adhering to the plate-shaped member that has been moved in the moving step to stop adhering to the plate-shaped member to place the plate-shaped member onto the predetermined position;

a holding step in which the controller causes the holding device to hold the interleaving paper at the predetermined position;

an interleaving paper moving step in which the controller causes the interleaving paper to be moved such that a center line of the interleaving paper is positioned above the ridge of the interleaving paper storage tool; and an interleaving paper placing step in which the controller causes the holding device to stop holding the interleaving paper to release the interleaving paper above the interleaving paper storage tool.

\* \* \* \* \*